United States Patent
Hundley et al.

(10) Patent No.: US 9,635,799 B2
(45) Date of Patent: May 2, 2017

(54) DYNAMIC ROW SPACING PLANTER SYSTEM

(71) Applicant: Monsanto Technology LLC, St. Louis, MO (US)

(72) Inventors: Christopher A. Hundley, Collinsville, IL (US); Andrew D. Thielen, Scranton, IA (US); Brian Forinash, Kirkwood, MO (US); David J. Baitinger, Ankeny, IA (US); Timothy J. Forbes, Ames, IA (US)

(73) Assignee: Monsanto Technology LLC, St. Louis, MO (US)

( * ) Notice: Subject to any disclaimer, the term of this patent is extended or adjusted under 35 U.S.C. 154(b) by 222 days.

(21) Appl. No.: 14/421,659

(22) PCT Filed: Aug. 30, 2013

(86) PCT No.: PCT/US2013/057575
§ 371 (c)(1),
(2) Date: Feb. 13, 2015

(87) PCT Pub. No.: WO2014/036435
PCT Pub. Date: Mar. 6, 2014

(65) Prior Publication Data
US 2015/0250089 A1 Sep. 10, 2015

Related U.S. Application Data

(60) Provisional application No. 61/695,499, filed on Aug. 31, 2012.

(51) Int. Cl.
*A01B 73/00* (2006.01)
*A01B 73/02* (2006.01)
(Continued)

(52) U.S. Cl.
CPC ............ *A01B 73/005* (2013.01); *A01B 73/00* (2013.01); *A01C 7/08* (2013.01); *A01C 7/208* (2013.01)

(58) Field of Classification Search
CPC ........ A01B 73/005; A01B 73/02; A01B 73/08
(Continued)

(56) References Cited

U.S. PATENT DOCUMENTS 5,921,325 A * 7/1999 Meek ................... A01B 73/044
111/52
6,119,882 A * 9/2000 Crook ................... B60B 35/003
180/433

(Continued)

FOREIGN PATENT DOCUMENTS

CN 101547595 A 9/2009
WO 2008024760 A2 2/2008

OTHER PUBLICATIONS

Chinese Office Action from corresponding Patent Application No. 201380045256.8 issued Dec. 29, 2015.
(Continued)

*Primary Examiner* — John G Weiss
(74) *Attorney, Agent, or Firm* — Polster Lieder

(57) ABSTRACT

The present disclosure provides a transformable agricultural planter that is structured and operable to transform to a Transport Configuration wherein a width of the planter is less than or equal to a Department Of Transportation maximum load width for which special 'Wide Load' permits are not required. The planter includes a support cart including a telescoping support axle having a plurality of wheel assemblies mounted thereto and a plurality of actuators connected to the telescoping support axle. The actuators are operable to extend and retract the telescoping support axle such that a spacing between the wheel assemblies can be set to any desired distance. The planter additionally includes a main
(Continued)

toolbar assembly connected a toolbar lift and spin assembly rotatably mounted to the support cart and operable to rotate, raise and lower the main toolbar assembly between the Transport Configuration and a Planting Configuration.

21 Claims, 20 Drawing Sheets

(51) Int. Cl.
 *A01C 7/08* (2006.01)
 *A01C 7/20* (2006.01)
(58) Field of Classification Search
 USPC ...... 111/52, 53, 59, 69; 172/244, 240, 799.5
 See application file for complete search history.

(56) References Cited

U.S. PATENT DOCUMENTS

| | | | | |
|---|---|---|---|---|
| 6,202,756 | B1 | 3/2001 | Hundeby et al. | |
| 6,213,034 | B1* | 4/2001 | Raducha | A01B 73/005 111/55 |
| 6,321,852 | B1* | 11/2001 | Pratt | A01B 73/005 111/59 |
| 6,681,866 | B1* | 1/2004 | Raducha | A01B 73/005 111/59 |
| 7,017,676 | B2* | 3/2006 | Neufeld | A01B 73/005 172/452 |
| 7,143,839 | B2* | 12/2006 | Neufeld | A01B 59/042 172/776 |
| 7,182,146 | B2* | 2/2007 | Erickson | A01B 59/042 172/776 |
| 7,469,648 | B2* | 12/2008 | Bettin | A01B 73/065 111/200 |
| 7,775,167 | B2* | 8/2010 | Stehling | A01C 7/208 111/200 |
| 8,028,506 | B1 | 10/2011 | Casper et al. | |
| 8,733,256 | B2* | 5/2014 | Kinzenbaw | A01B 73/048 111/52 |
| 2008/0047475 | A1 | 2/2008 | Stehling et al. | |
| 2011/0273003 | A1 | 11/2011 | Mackin et al. | |

OTHER PUBLICATIONS

International Search Report from corresponding PCT/US2013/057575 mailed Feb. 7, 2014.

* cited by examiner

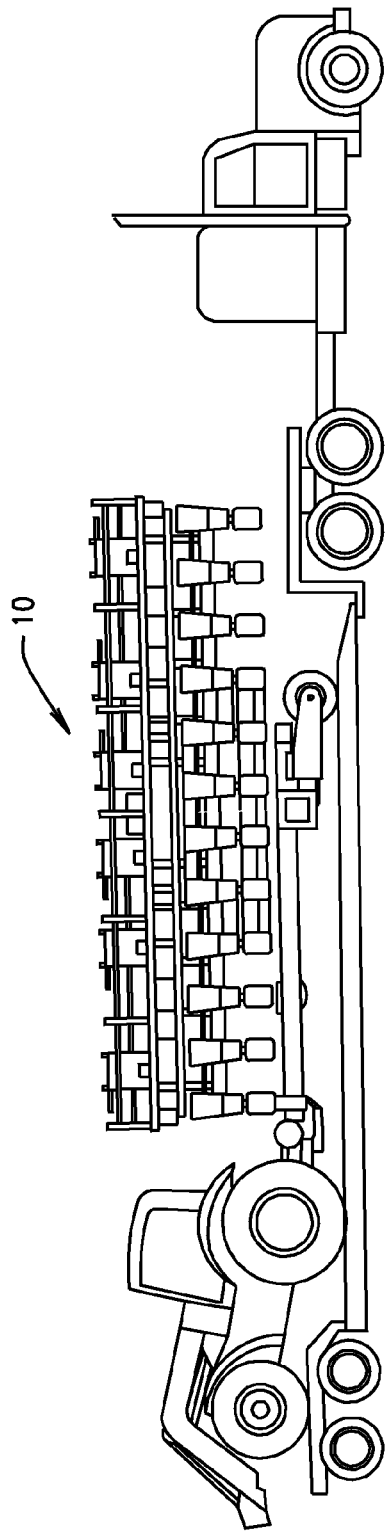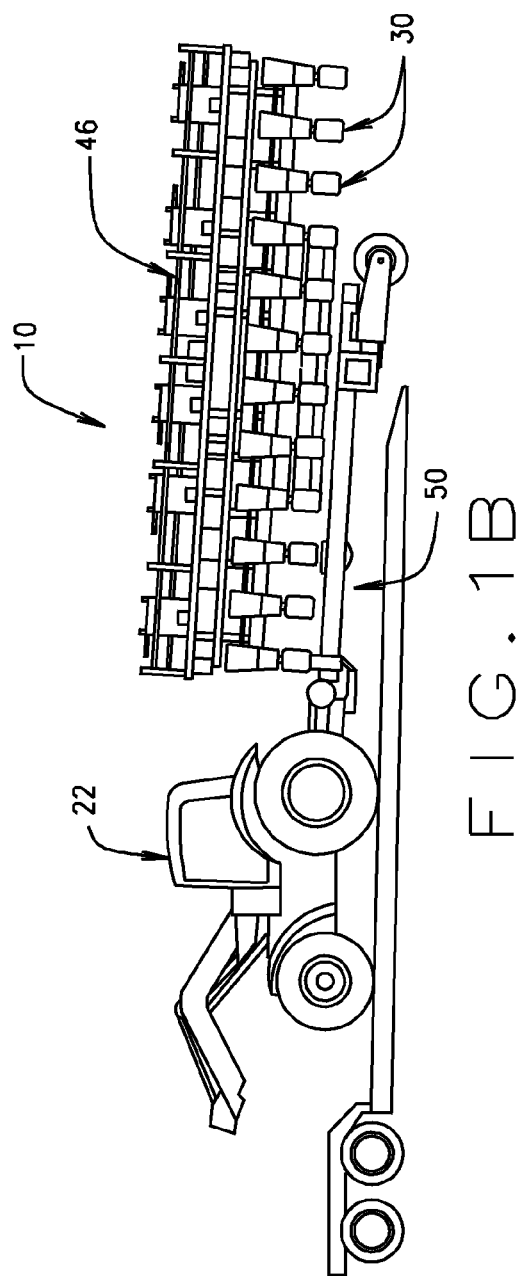

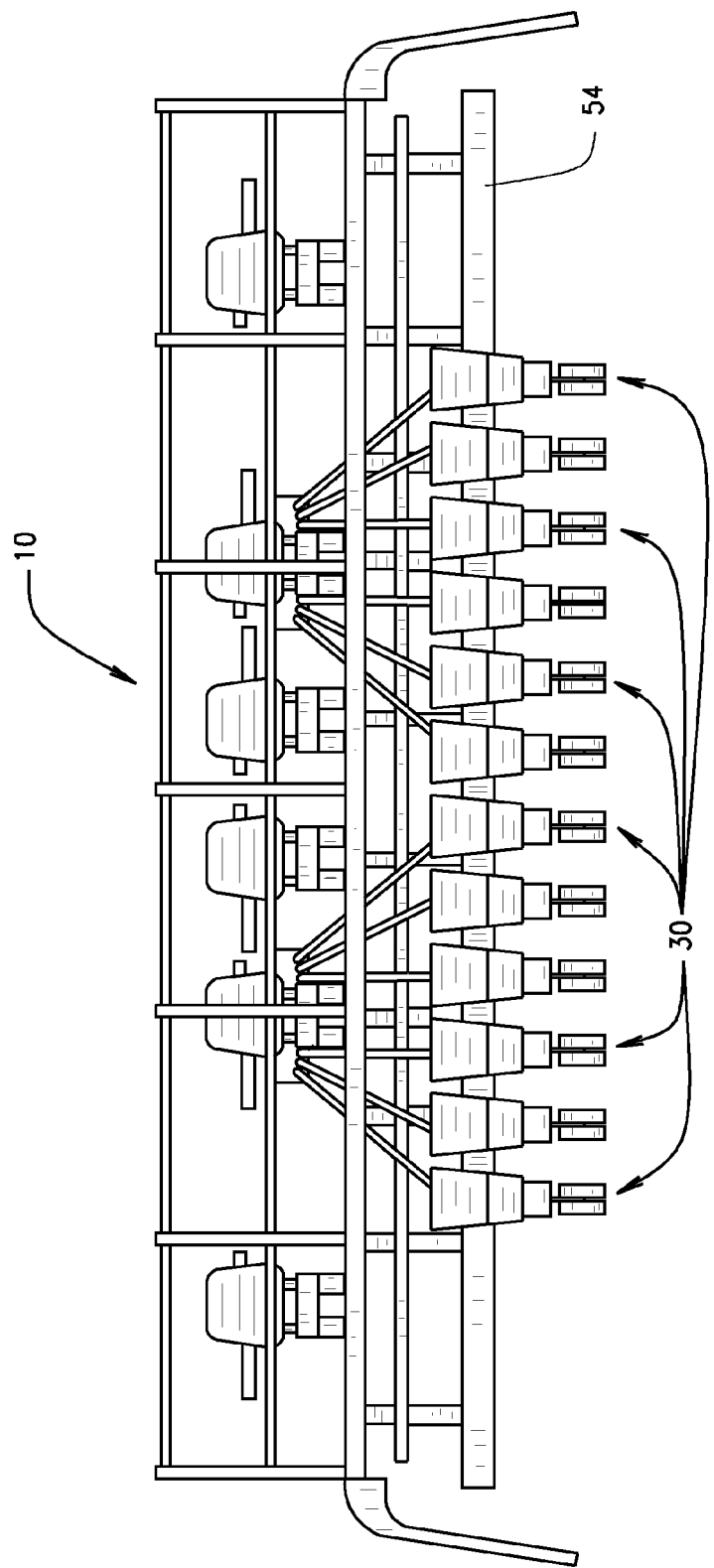

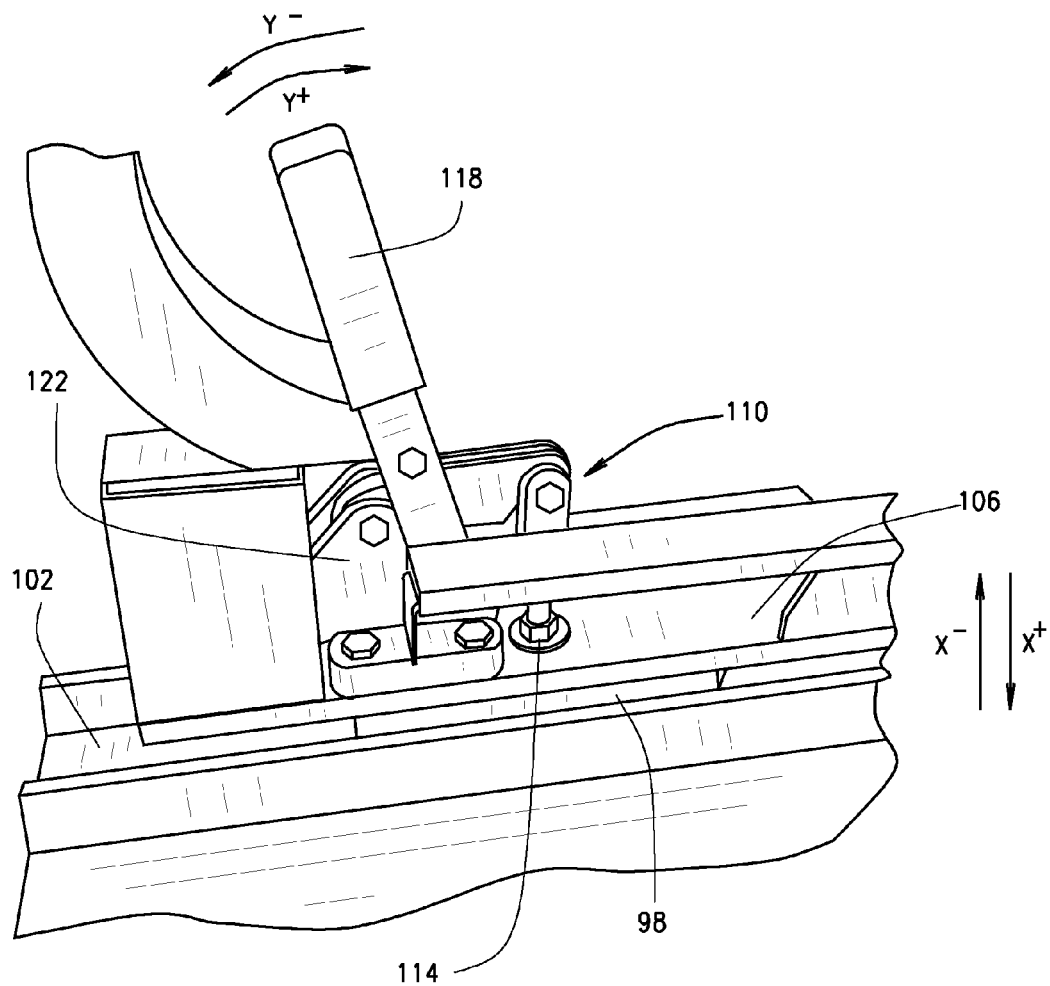
F I G . 3D

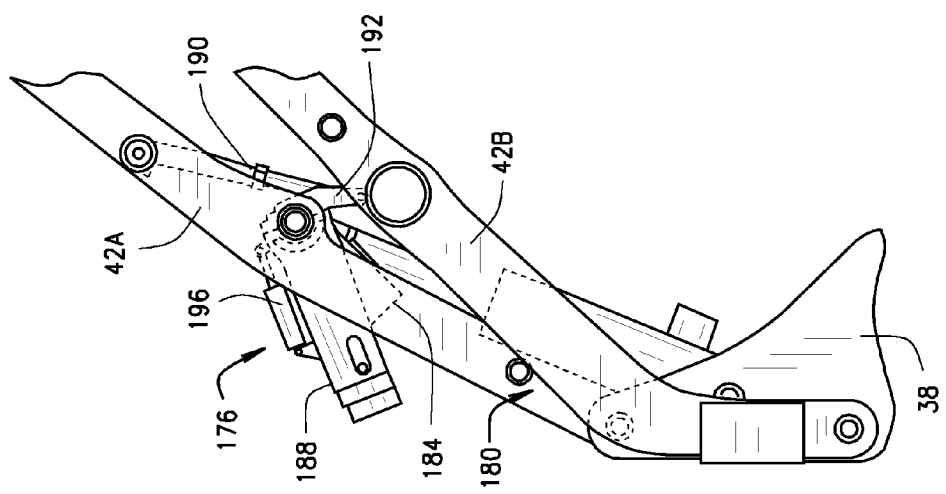
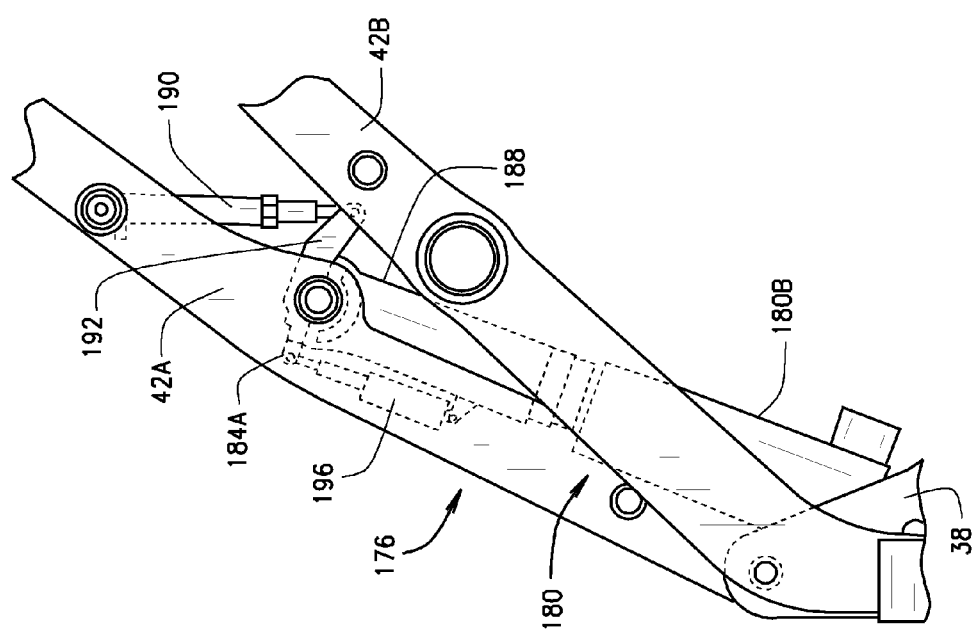

DYNAMIC ROW SPACING PLANTER SYSTEM

CROSS-REFERENCE TO RELATED APPLICATIONS

This application is the US national stage under 35 U.S.C. §371 of International Application No. PCT/US2013/057575, filed on Aug. 30, 2013, which is a PCT International Application of U.S. Application No. 61/695,499, filed on Aug. 31, 2012, the disclosure of which is incorporated herein by reference in its entirety.

FIELD

The present disclosure relates to a transformable multi-row agricultural plot planter that can be configured to plant eight or more rows of seed, and transformed to fit on a standard eighteen wheel tractor trailer flatbed trailer such that the transport-ready planter requires no Department of Transportation 'Wide Load' authorizations.

BACKGROUND

The statements in this section merely provide background information related to the present disclosure and may not constitute prior art.

Current method of planting plots having varying spacing between the rows (e.g., ranging from 15 to 40 inch), referred to herein as row spacing or row widths, typically requires the use several different planters and transporting them to each location, or spending extensive amounts of time revamping a single planter to achieve different row widths.

Additionally, known planters are often missing critical systems for making the entire planting system optimal for planting under numerous row spacing configurations. Examples of this are having a tractor that cannot easily adjust wheel track to match planter row spacing and components on the planter that do not adjust or do not easily adjust to match planter row spacing configuration such as seats, splitters, handrails, seed tray holders, etc.

SUMMARY

The present disclosure provides a transformable agricultural plot planter that is structured and operable to be transformable, or collapsible, to a 'Transport Configuration' having a size and footprint that enables the planter and the tractor, to which the planter is attached or integrally formed with, to be driven onto and loaded on a standard eight wheel tractor trailer flatbed trailer such that the planter conforms to DOT (Department of Transportation) specifications, whereby the transport-ready planter 10 and tractor trailer require no special 'Wide Load' authorization or escort. Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1A is a side view of a transformable agricultural plot planter configured in a 'Transport Configuration' loaded on a standard eight wheel tractor trailer flatbed trailer, in accordance with various embodiments of the present disclosure.

FIG. 1B is a side view of the transformable agricultural plot planter shown in FIG. 1A, configured in the 'Transport Configuration', as the planter is being loaded onto a standard eight wheel tractor trailer flatbed trailer, in accordance with various embodiments of the present disclosure.

FIG. 2D is a rear view of the transformable agricultural plot planter shown in FIG. 1A, configured in a 'Planting Configuration' and deployed in a field, in accordance with various embodiments of the present disclosure.

FIG. 3D is an isometric view of the carriage assembly of the row unit of the transformable agricultural plot planter shown in FIG. 1A slidably mounted to the row unit mounting beam and including a lever locking mechanism, in accordance with various other embodiments of the present disclosure.

Figure 9A:
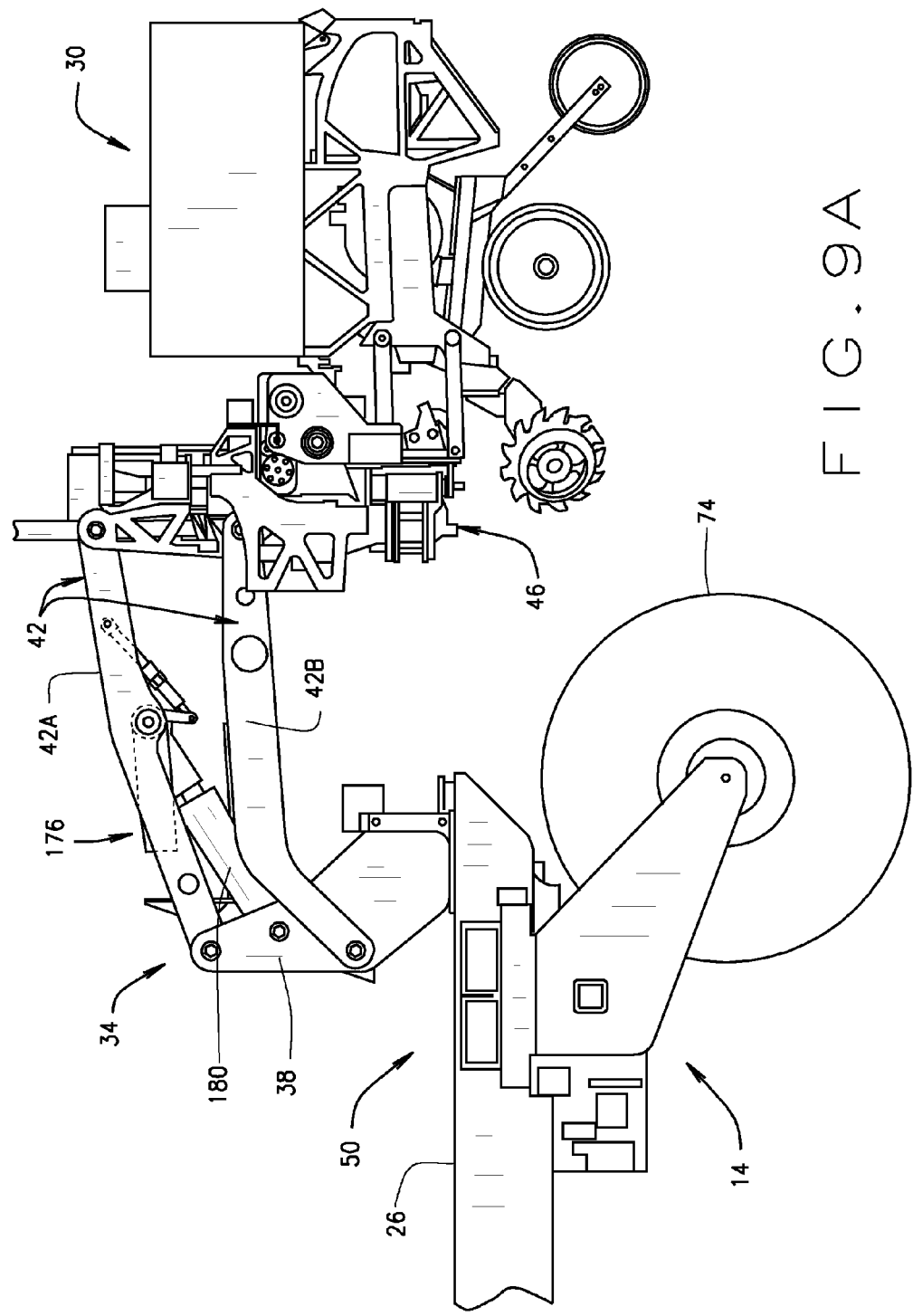

FIG. 9A side view of a toolbar lift and spin assembly of the transformable agricultural plot planter shown throughout the various figures including a ram stop, in accordance with various embodiments of the present disclosure.

Figure 9B:
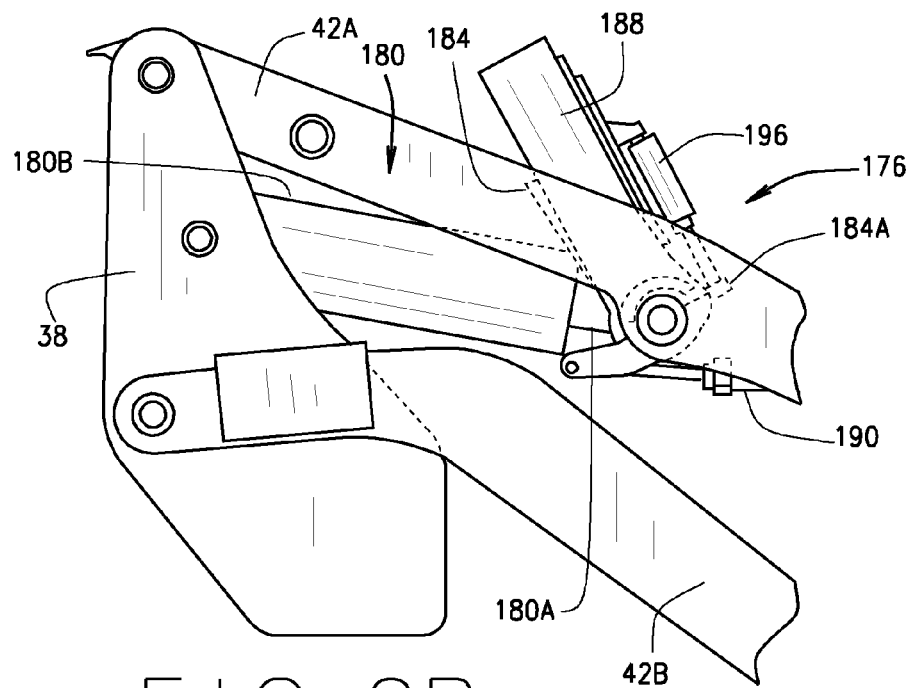

FIG. 9B is a side view of the ram stop shown in FIG. 9A configured in a non-deployed position, in accordance with various embodiments of the present disclosure.

Figure 9C:
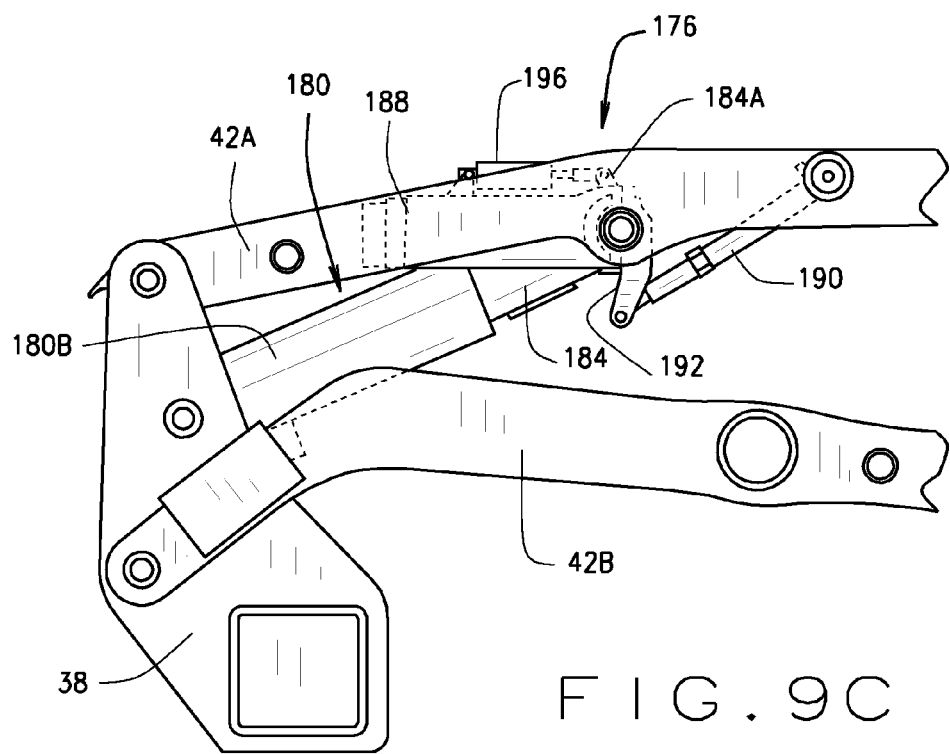

FIG. 9C is a side view of the ram stop shown in FIG. 9A configured in a first deployed position, in accordance with various embodiments of the present disclosure.

FIG. 9D is a side view of the ram stop shown in FIG. 9A configured in a second deployed position, in accordance with various embodiments of the present disclosure.

FIG. 9E is a side view of the ram stop shown in FIG. 9A configured in a neutral position, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Referring to the FIGS. 1A through 2B, the present disclosure provides a transformable agricultural plot planter 10 that is structured and operable to be transformable, or collapsible, to a 'Transport Configuration' having a size and footprint that enables the planter 10 and a tractor 22, to which the planter 10 is attached or integrally formed with, to be driven onto and loaded on a standard eight wheel tractor trailer flatbed trailer such that the planter 10, in the Transport Configuration, conforms to DOT (Department of Transportation) specifications, whereby the transport-ready planter 10 and tractor trailer require no special DOT 'Wide Load' authorization or escort. The planter 10 is further structured and operable to subsequently be offloaded from the tractor trailer and be transformable, or expandable, to a 'Planting Configuration' where the planter 10 is configurable to simultaneously plant eight or more rows of seed, e.g., twelve or more rows, having any desired row spacing or width. That is, the planter 10 is structured and operable to be configurable to provide any desired planting density.

More specifically, the planter 10 is structured and operable such that, in the Planting Configuration, a plurality of row units 30 can be adjusted to generally any desired row spacing, e.g., from fifteen to forty inch row spacing quickly and easily, i.e., fifteen to forty inches between rows of seeds to be planted by the planter 10. The planter 10 can be connectable to the tractor 22 in a pull-behind fashion or integrally formed with the tractor 22 such that the planter 10 can traverse a field to plant seed in any selected number of rows at any selected row width to provide any desired planting density. Generally, the planter 10 includes a support cart, or carriage, 50, a planter main toolbar assembly 46 that includes the plurality of row units 30, and a toolbar lift and spin assembly 34 that is pivotally mounted to the support cart 50. The support cart 50, main toolbar assembly 46, and a toolbar lift and spin assembly 34 are cooperatively structured and operable to configure the planter 10 for any row spacing desired for row crop planting.

As described in more detail below, the pivotability of the main toolbar assembly 46 on the support cart 50, via the a toolbar lift and spin assembly 34, enables efficient transport capabilities of the planter 10 by allowing the main toolbar assembly 46 to lift up and selectively spin 90° between the Transport Configuration and the Planting Configuration. In various embodiments, when the planter 10 is transformed to the Transport Configuration, the combination of the planter 10 and the trailer on which the planter is loaded can have a height of less than 13 feet 6 inches and a width of less than 8 feet 6 inches, allowing the planter 10 to be loaded onto a standard double drop deck tractor trailer, thereby eliminating the need for 'Oversize' or 'Wide Load' permits from the Department of Transportation (DOT) to transport the planter 10 on United States highways.

Referring now to FIGS. 2A through 3C, the main toolbar assembly 46 additionally includes a row unit mounting beam 54 mounted to a main toolbar beam 56 and a plurality of row units carriage assemblies 58 slidingly mounted to the row unit mounting beam 54. Particularly, the row unit mounting beam 54 is structured and operable to slidingly accept the plurality of row unit carriage assemblies 58. Each carriage assembly 58 is structured and operable to be movable and positionable (automatically or manually) anywhere along the length of the mounting beam 54. Moreover, each carriage assembly 58 has connected thereto a respective one of the row units 30 such that each of the row units 30 can be positioned and locked in place anywhere along the length of the mounting beam 54 such that any desired distance or spacing between row units 30 can be achieved, thereby allowing for an infinite selection of row unit spacings.

Each row unit 30 includes a pair of parallel suspension arms 62 that are pivotally connected at proximal ends to a respective one of the carriage assemblies 58 and pivotally connected at distal ends to a planter head 66 of the respective row unit 30 such that, when the planter 10 is in the Planting Configuration, the row units 30 are free to float or oscillate up and down in the X⁻ and X⁺ directions with the contour of the ground as the planter 10 traverses a plot or field. Each planter head 66 includes a pair of gauge or support wheels 78 that generally bear the weight of the respective planter head 66 as the respective planter head 66 is pulled through the field. As described below, one or more opening discs (not shown) disposed between the gauge wheels 78 penetrate and divide the soil to generate a furrow. Additionally, as the respective planter head 66 is pulled through the field, a corresponding seed distribution system 86 distributes seed into the furrow at any selected rate and one or more cover discs 82 push the divided soil over the distributed seed to cover the seed. Furthermore, a press wheel 90 pushes the divided soil over the distributed seed to cover the seed, as the respective planter head 66 is pulled through the field. As described above, the suspension arms 62 are pivotally connected to the carriage assemblies 58 and the planter heads 66. Particularly, the suspension arms 62 allow the respective planter head 66 to move up and down in the X⁺ and X⁻ directions with the contour of the ground as the respective planter head 66 is pulled through the field.

The design of the main toolbar assembly 46 enables the planter 10 to be scaled to any number of row units 30 desired and to provide a wide range of spacing configuration options for the use. The sliding carriage assembly 58 design provides freedom and ease of adjustment so operators can easily and quickly change row spacing configurations. The combination of sliding carriage assemblies 58 and pivoting toolbar assembly 46 provides for an all-in-one solution to planting plots and meeting the row spacing requirements of any spacing configuration. Another key feature of the present planter 10 is a telescopic wheel-axle assembly 14 of the support cart 50, described below, that provides wheel track adjustment that can be adjusted to properly support the main toolbar assembly 46 and coordinate with the row spacing of the row units 30. It is further envisioned that in various embodiments the footprint and spacing of the wheels of the tractor 22 can be adjustable for quickly adjusting the tractor wheel track to match the desired row spacing configuration.

Figure 3A:
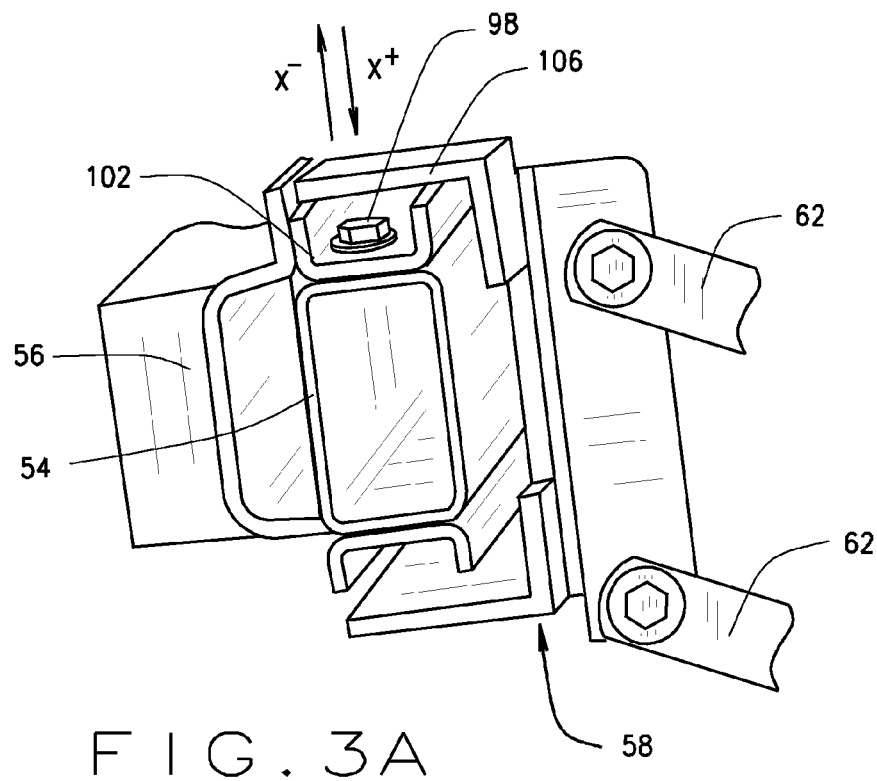
FIG. 3A is an end view of a carriage assembly of one of a plurality of a row units of the transformable agricultural plot planter shown in FIG. 1A slidably mounted to a row unit mounting beam of the transformable agricultural plot planter shown in FIG. 1A, in accordance with various embodiments of the present disclosure.
Figure 3B:
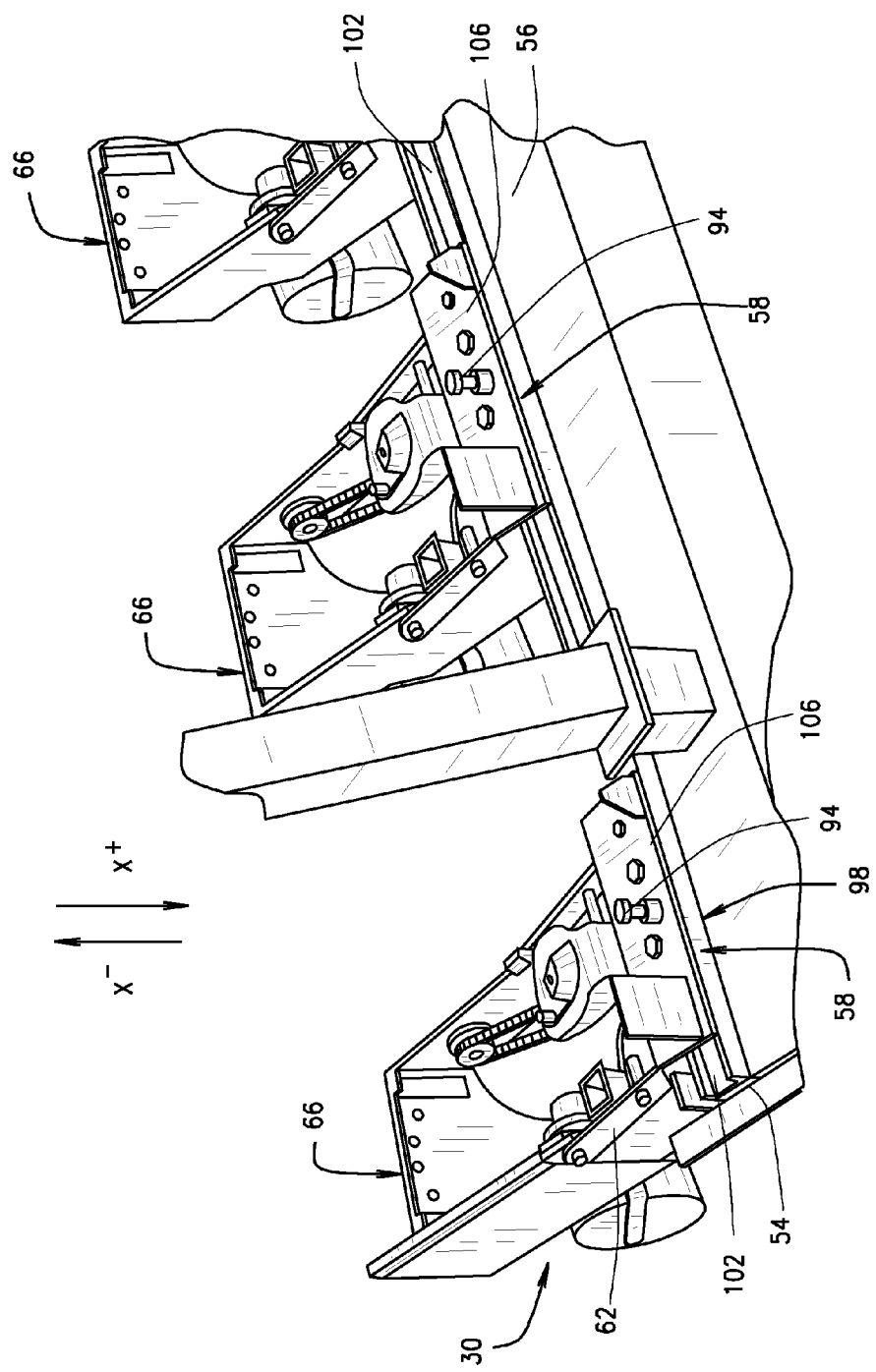
FIG. 3B is an isometric view of the carriage assembly of the row unit of the transformable agricultural plot planter shown in FIG. 1A slidably mounted to the row unit mounting beam and including a locking bolt, in accordance with various embodiments of the present disclosure.
Figure 3C:
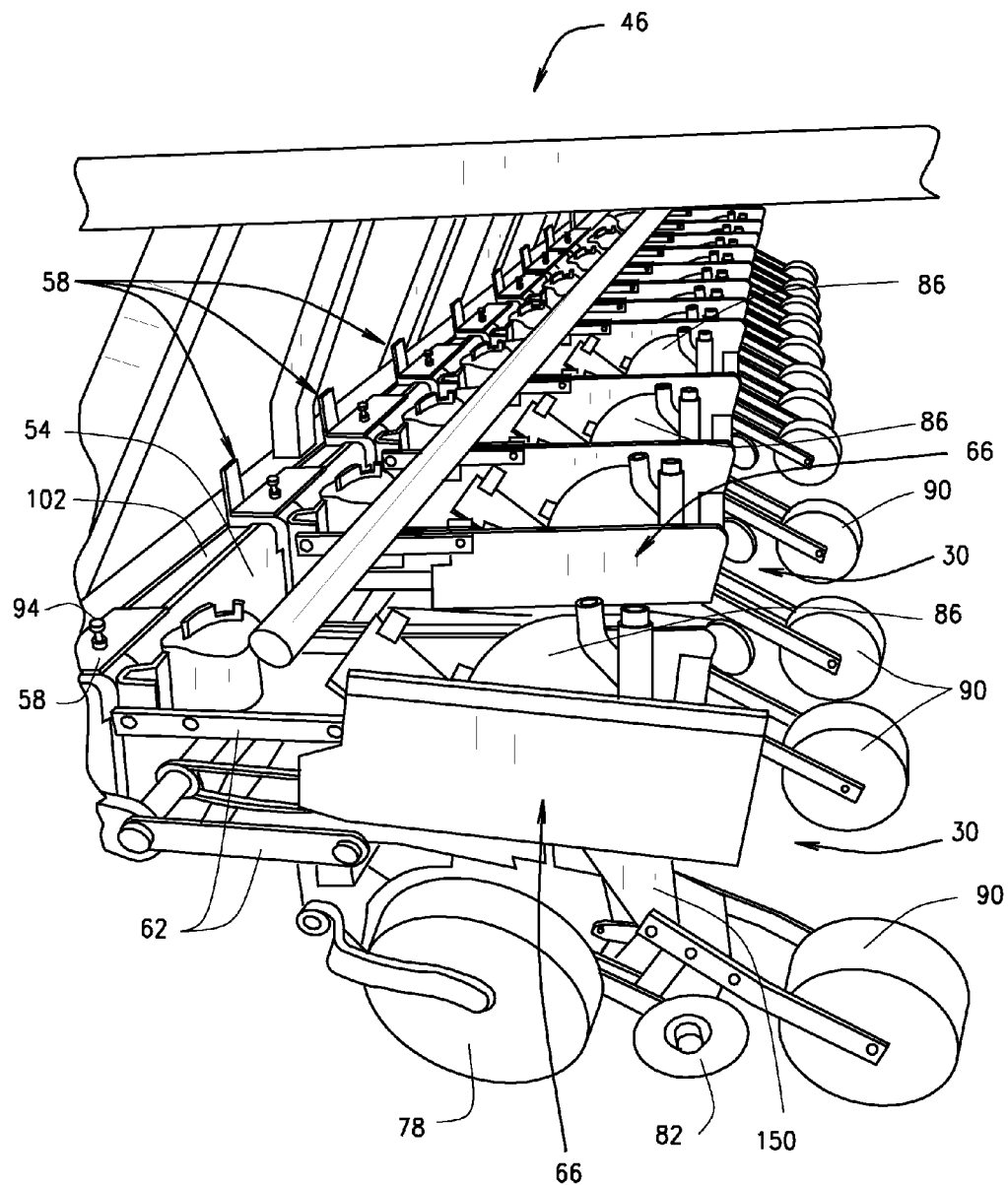
FIG. 3C is an isometric view of a plurality of row units of the transformable agricultural plot planter shown in FIG. 1A equally spaced along the length of the row unit mounting beam, in accordance with various embodiments of the present disclosure.

Referring now to FIGS. 3A, 3B and 3C, as described above, each carriage assembly 58 is structured and operable to be movable and positionable (automatically or manually) anywhere along the length of the mounting beam 54 such that the row units 30 can be spaced apart from each other along the mounting beam 54 at any desired distance. In various embodiments, each carriage assembly 58 includes a locking bolt 94 and friction plate 98 which are cooperable to 'lock', i.e., fixedly retain, the respective carriage assembly/row unit 58/30 at the desired location along the mounting beam 54.

The friction plate 98 of each carriage assembly 58 is disposed within an upper channel 102 of the mounting beam 54 between the mounting beam 54 and a top plate 106 of the respective carriage assembly. The locking bolt 94 is threadingly engaged with and extends through the carriage assembly top plate 106. In various implementations, the locking bolt 94 is rotationally connected to the friction plate 98 and operable to apply a downward force to the friction plate 98 in the X+ direction when rotated to advance the locking bolt 94 in the X+ direction. Alternatively, the locking bolt 94 can be independent of the friction plate 98 and operable to contact and apply a downward force to the friction plate 98 in the X+ direction when rotated to advance the locking bolt 94 in the X+ direction.

In operation, once a carriage assembly/row unit 58/30 is positioned along the row unit mounting beam 54 at a desired location, the respective locking bolt 94 can be rotated to advance the locking bolt 94 in the X+ direction whereby the locking bolt applies a force to the friction plate 98 in the X+ direction. The force in the X+ direction applied to the friction plate 98 causes the friction plate 98 to be wedged into and bind or clamp the respective carriage assembly 58 with or to the mounting beam upper channel 102 with sufficient force to prevent the carriage assembly/row unit 58/30 from moving along the mounting beam 54. To release the carriage assembly/row unit 58/30 from the mounting beam 54 so that the row unit 30 can be moved along the mounting beam 54, the locking bolt 94 is rotated to withdraw the locking bolt 94 in the X− direction, thereby releasing the force applied to the friction plate 98 such that the friction plate 98 can move along the mounting beam 54 within the mounting beam upper channel 102.

Referring now to FIGS. 3A and 3D, in various embodiments, each carriage assembly 58 includes a lever locking mechanism 110, a locking pin 114 and the friction plate 98 which are cooperable to 'lock', i.e., fixedly retain, the respective carriage assembly 58/row unit 30 at the desired location along the mounting beam 54.

As described above, the friction plate 98 of each carriage assembly 58 is disposed within an upper channel 102 of the mounting beam 54 between the mounting beam 54 and the top plate 106 of the respective carriage assembly. The locking pin 114 can be any suitable pin, rod or bolt that slidingly extends through the carriage assembly top plate 106 such that it is free to move up and down in the X− and X+ direction as controlled by the lever locking mechanism 110, as described below. In various implementations, the locking pin 114 is rotationally connected to the friction plate 98 and operable to apply a downward force to the friction plate 98 in the X+ direction when advanced in the X+ direction via force applied to the locking pin 114 by the lever locking mechanism 110. Alternatively, the locking pin 114 can be independent of the friction plate 98 and operable to contact and apply a downward force to the friction plate 98 in the X+ direction when advanced in the X+ direction via force applied to the locking pin 114 by the lever locking mechanism 110.

The lever locking mechanism 110 is mounted to a top surface of the respective carriage assembly top plate 106 adjacent the locking pin 114 and includes a lever 118 operatively connected to a clamping mechanism 122. Particularly, movement of the lever 118 in the Y+ direction from a released position (shown in FIG. 3D) to a locked position will cause the clamping mechanism 122 to apply a downward force in the X+ direction to the locking pin 114. In various implementations, the lever locking mechanism 110 is structured and operable such that when the lever 118 is moved to the locked position, the force applied to the locking pin 114 will retain the lever 118, and hence the clamping mechanism 122, in the locked position such that the force applied to locking pin 114 is maintained until the lever 118 is moved back to the released position. For example, in various implementations the lever locking mechanism 110 can include a cam, or similar device, that will hold the lever 118, and hence the clamping mechanism 122, in the locked position until the lever 118 is pulled in the Y− direction to the released position. Alternatively, in various implementations the lever locking mechanism 110 can include any other device, e.g., a pin, clamp, bar, block, hook, actuator or other device suitable to retain the lever in the locked position.

In operation, once a respective carriage assembly/row unit 58/30 is positioned along the row unit mounting beam 54 at a desired location, the respective lever 118 can be moved in the Y+ direction, from the released position to the locked position, whereby the lever 118 causes the clamping mechanism to apply in the X+ direction to the locking pin 114, which in turn applies a force to the friction plate 98 in the X+ direction. The force in the X+ direction applied to the friction plate 98 causes the friction plate 98 to be wedged into and bind or clamp the respective carriage assembly 58 with or to the mounting beam upper channel 102 with sufficient force to prevent the carriage assembly/row unit 58/30 from moving along the mounting beam 54. To release the carriage assembly/row unit 58/30 from the mounting beam 54 so that the row unit 30 can moved along the mounting beam 54, the lever 118 is moved in the Y− direction from the locked position to the released position, thereby removing the force applied by the clamping mechanism 112 to the locking pin 114, and consequently releasing the force applied to the friction plate 98 such that the friction plate 98 can move along the mounting beam 54 within the mounting beam upper channel 102.

Referring now to FIGS. 2B, 2C, 2E, 2F, 2G, 4A, 4B and 4C, the support cart 50 includes the telescopic wheel-axle assembly 14, a telescopic neck 18 that is orthogonally connected to the wheel-axle assembly 14 and can be adjusted to any desired length, and a work deck 26 that is disposed on top of the neck 18 above the wheel-axle assembly 14. Rotatably mounted to a top surface of the work deck 26 is the toolbar lift and spin assembly 34 that is structured to lift and rotate the main toolbar assembly 46 from the Transport Configuration to the Planting Configuration, and vice versa.

Figure 2A:
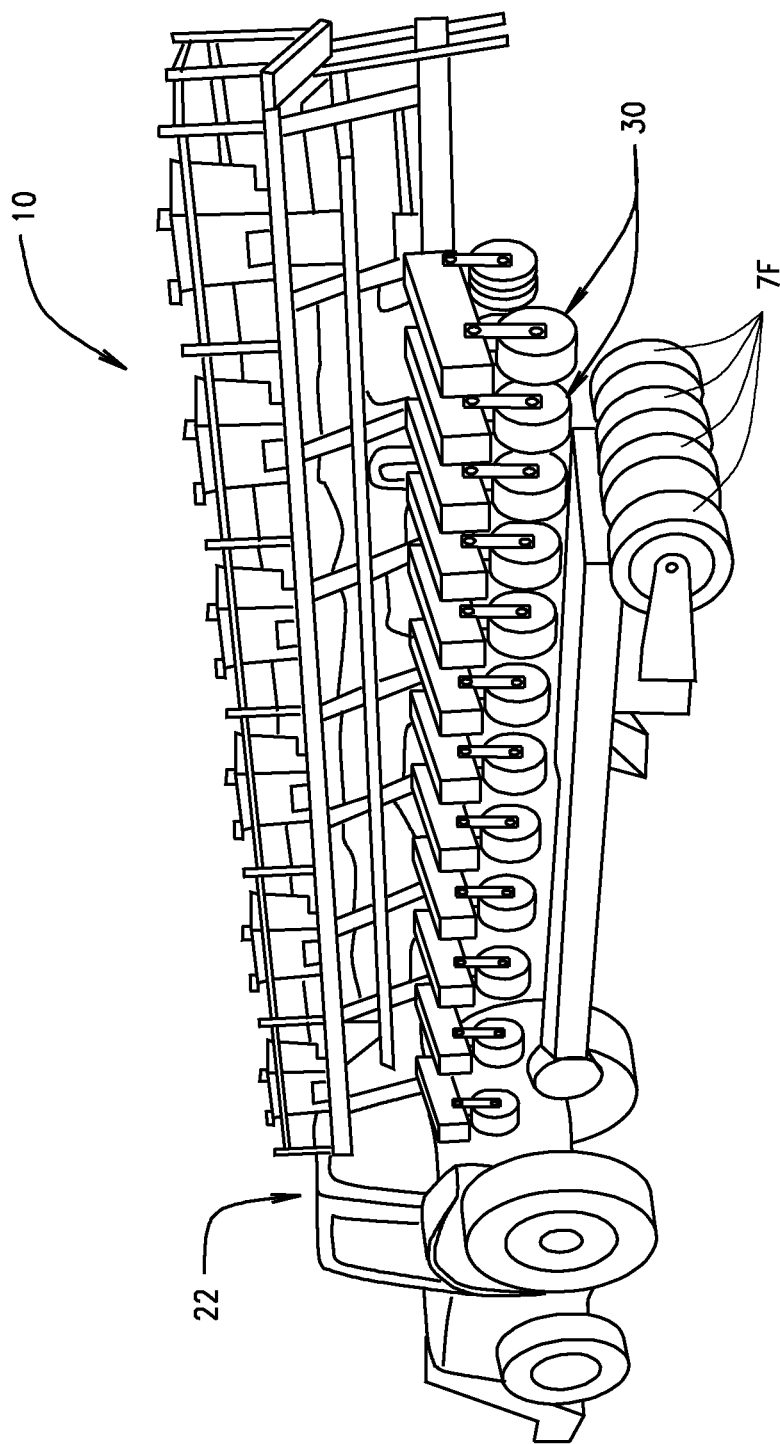
FIG. 2A is an isometric view of the transformable agricultural plot planter shown in FIG. 1A, configured in the 'Transport Configuration', ready for deployment into a field, in accordance with various embodiments of the present disclosure.
Figure 2B:
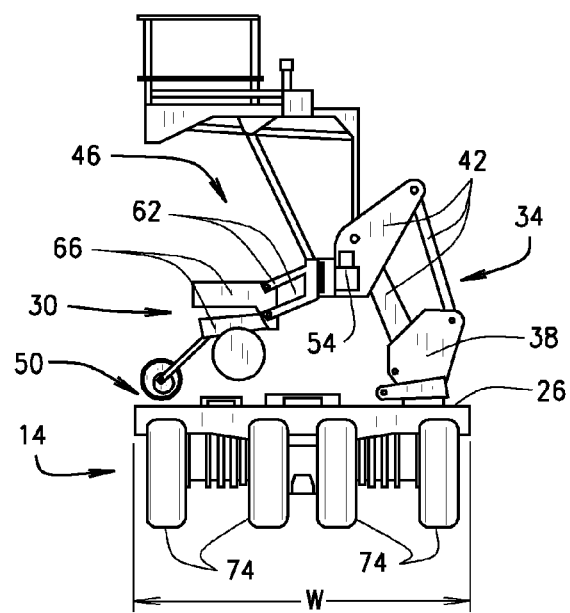
FIG. 2B is a rear view of the transformable agricultural plot planter shown in FIG. 2A, configured in the 'Transport Configuration', ready for deployment into a field, in accordance with various embodiments of the present disclosure.
Figure 2C:
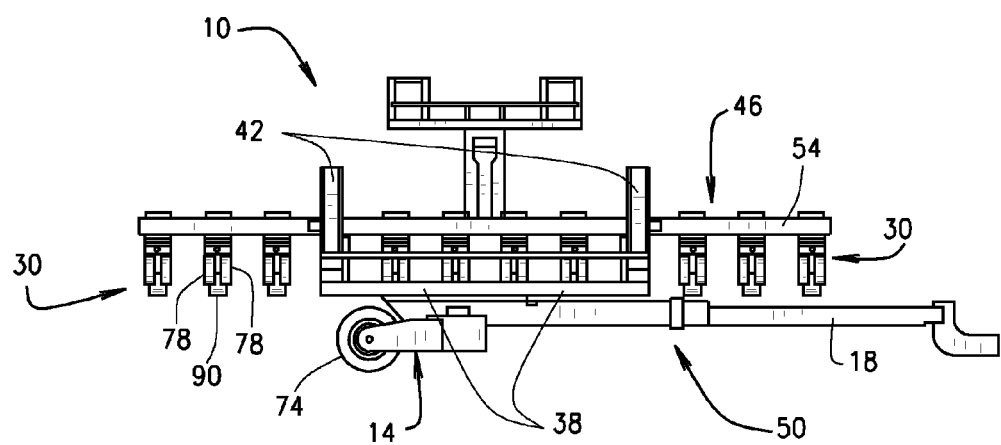
FIG. 2C is a side view of a toolbar of the transformable agricultural plot planter shown in FIG. 1A, configured in the 'Transport Configuration', in accordance with various embodiments of the present disclosure.
Figure 2E:
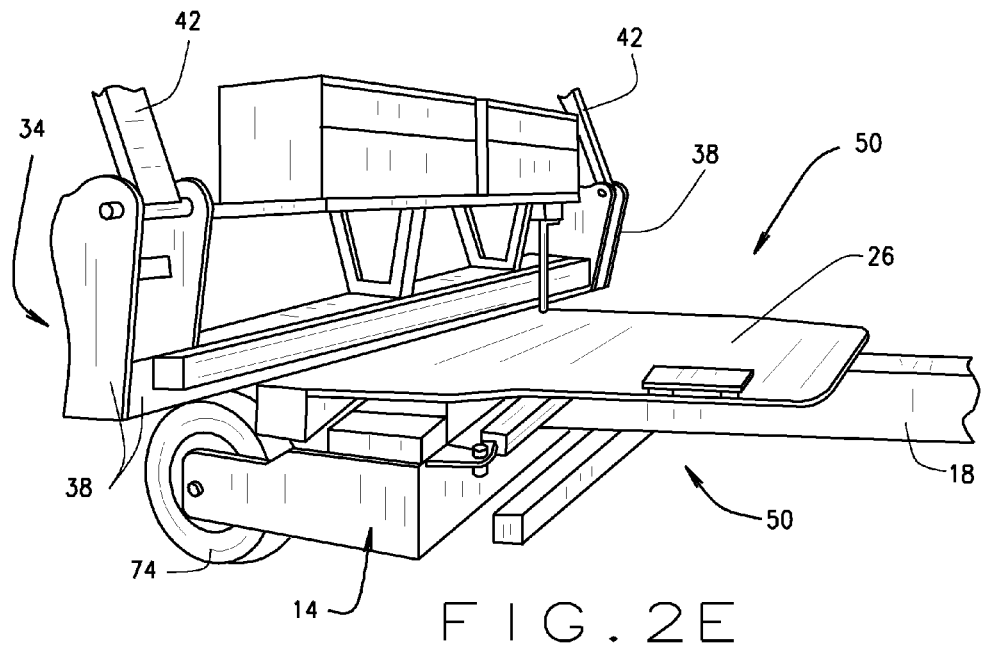
FIG. 2E is an isometric view of the support cart of the transformable agricultural plot planter shown in FIG. 1A having the toolbar rotated orthogonally with an expandable neck of the support cart, ready to be configured in the 'Planting Configuration', in accordance with various embodiments of the present disclosure.
Figure 2F:
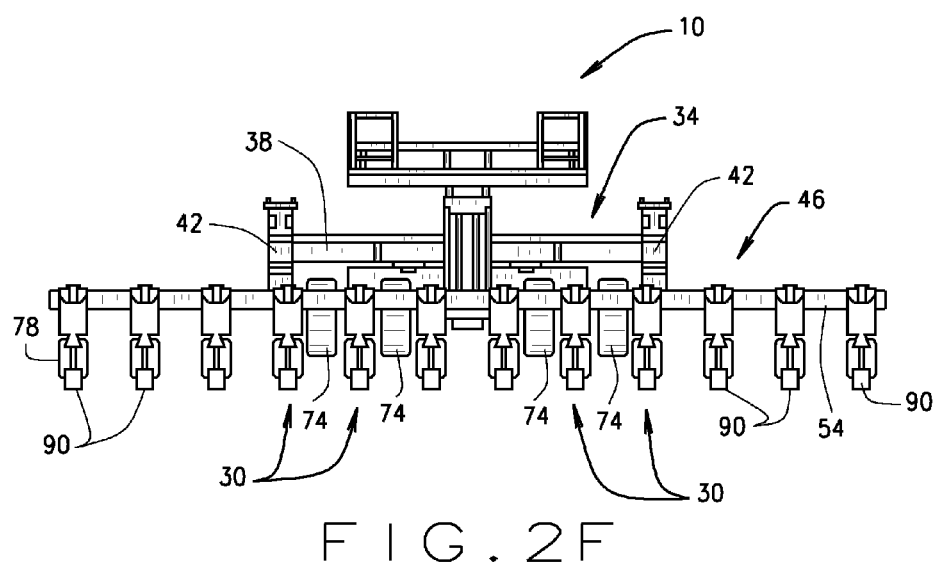
FIG. 2F is a rear view of the transformable agricultural plot planter shown in FIG. 1A, configured in the 'Planting Configuration', in accordance with various embodiments of the present disclosure.
Figure 2G:
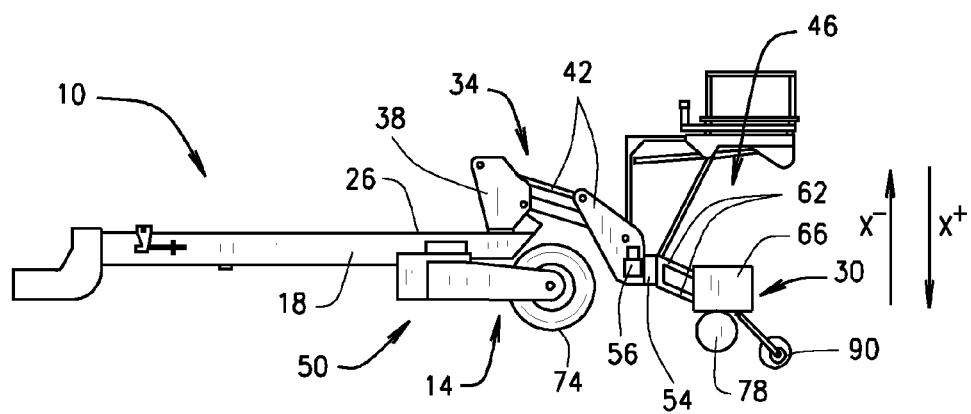
FIG. 2G is a side view of the transformable agricultural plot planter shown in FIG. 2F, configured in the 'Planting Configuration', in accordance with various embodiments of the present disclosure.

Referring specifically to FIGS. 2B, 2C, 2E, 2F and 2G, the toolbar lift and spin assembly 34 comprises a base cradle 38 that is rotatably connected to the support cart 50 above the work deck 26. The base cradle 38, and hence the main toolbar assembly 46, is controllably rotatable via one or more rotation drives (not shown), e.g., one or more motors, one or more pneumatic or hydraulic actuators, etc. The rotation drive(s) are structured and operable to controllably rotate the base cradle 38, and hence the main toolbar assembly 46, approximately 90° between the Transport Configuration, wherein the base cradle 38 and main toolbar assembly 46 are positioned above the work deck 26 substantially parallel to a center axis C (shown in FIG. 4A) of the support cart 50 (as shown in FIGS. 2B and 2C), and the Planting Configuration, wherein the base cradle 38 and main toolbar assembly 46 are positioned substantially orthogonal to the center axis C with the main toolbar 46 disposed behind the support cart 50 (as shown in FIGS. 2F and 2G).

The main toolbar assembly 46 is connected to the base cradle 38 via a pair of automated lift arm assemblies 42 that are connected to the main toolbar beam 56. The lift arm assemblies 42 are structured and operable to raise and lower the main toolbar assembly 46 to any desired height (relative to the ground) between the Transport Configuration and the Planting Configuration. In the Transport Configuration, the main toolbar assembly 46 is positioned above the support cart work deck 26 such that the combined width W of the main toolbar assembly 46 (inclusive of the row units 30) and the toolbar lift and spin assembly 34 is less than or equal to the DOT maximum load width for which special 'Oversize' or 'Wide Load' permits are not required (as shown in FIGS. 2B and 2C). For example, in many states the maximum load width for which special 'Oversize' or 'Wide Load' permits are not required is 102 inches (8.5 feet). Thus, in such states the planter 10 would be transformable to Transport Configuration, wherein the combined width W of the main toolbar assembly 46 (inclusive of the row units 30) and the toolbar lift and spin assembly 34 would be less than or equal 102 inches.

In the Planting Configuration, the main toolbar assembly 46 is positioned behind the support cart 50 wheel-axle assembly 14 with the planter head gauge wheels 78, opening discs, covering discs 82 and press wheel 90 of each row unit 30 positioned in contact with the ground, whereby the row units 30 are operable for tilling and planting of seed (as shown in FIGS. 2F and 2G).

Figure 4A:
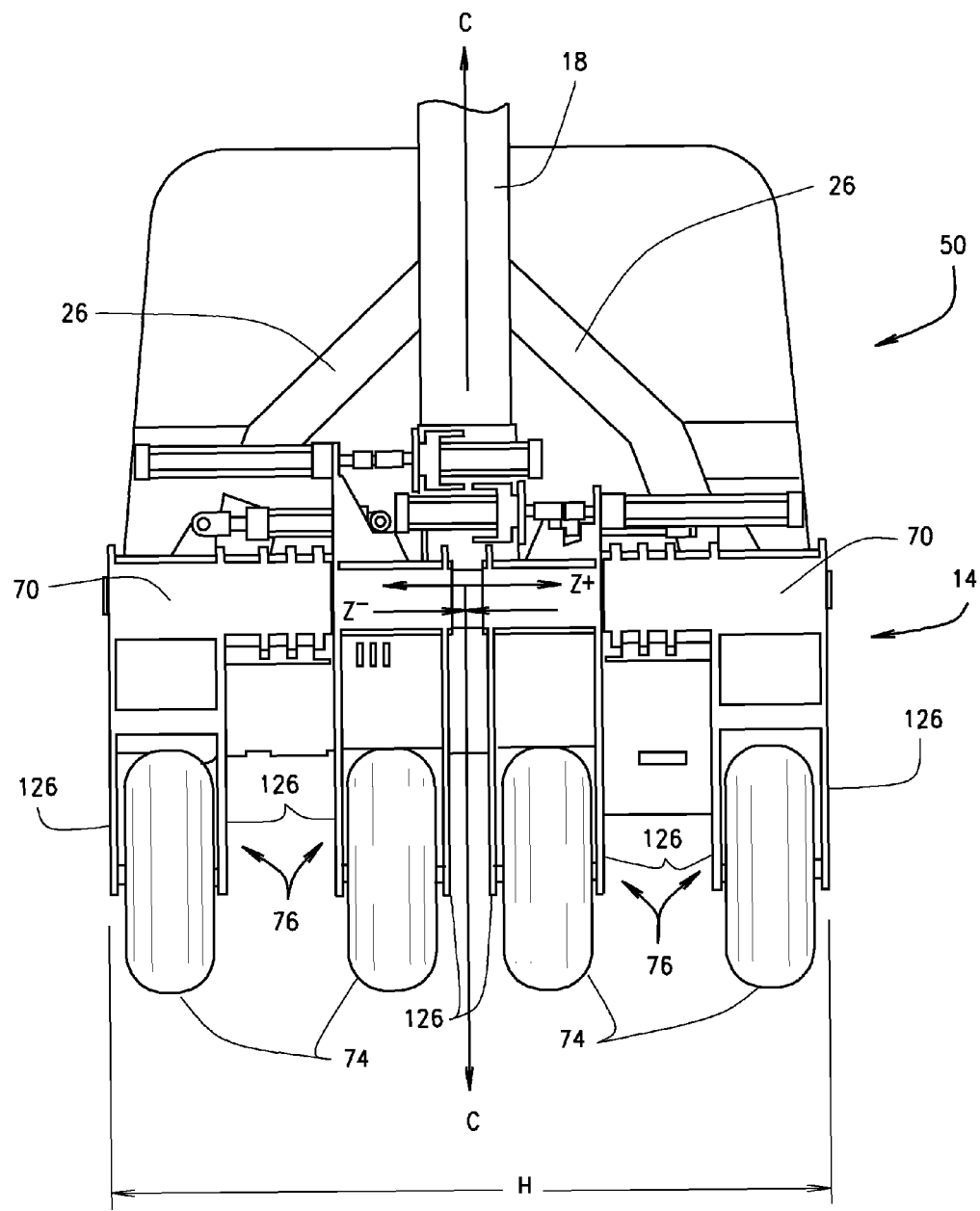
FIG. 4A is a bottom view of a support cart of the transformable agricultural plot planter shown in FIG. 1A including a hollow hybrid telescopic axle for adjusting the support cart wheels to any desired spacing, the telescoping axle being shown in a Retracted Configuration, in accordance with various embodiments of the present disclosure.
Figure 4B:
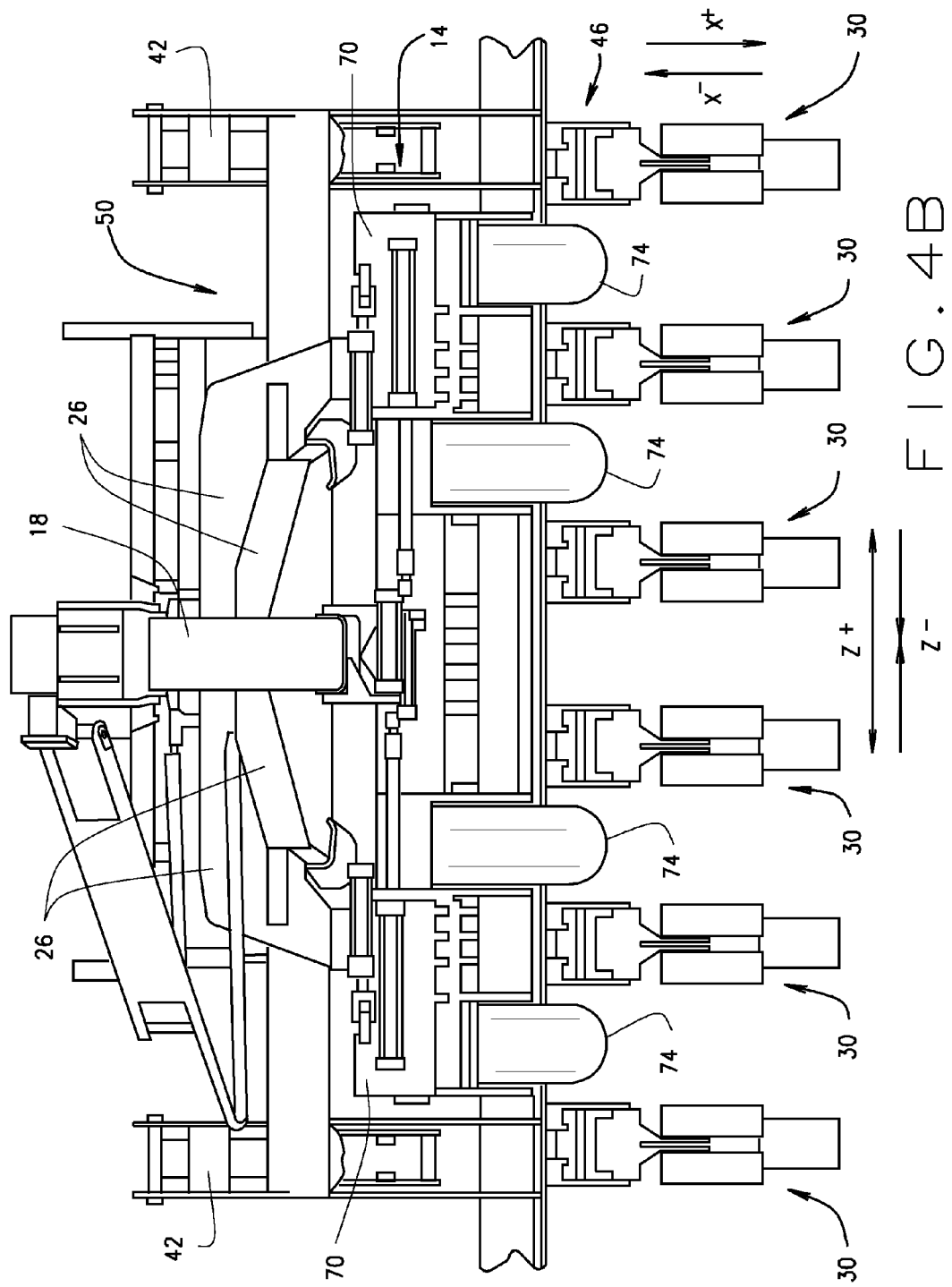
FIG. 4B is a front-bottom view of the support cart shown in FIG. 4A having the telescopic axle shown in an Expanded Configuration, in accordance with various embodiments of the present disclosure.
Figure 4C:
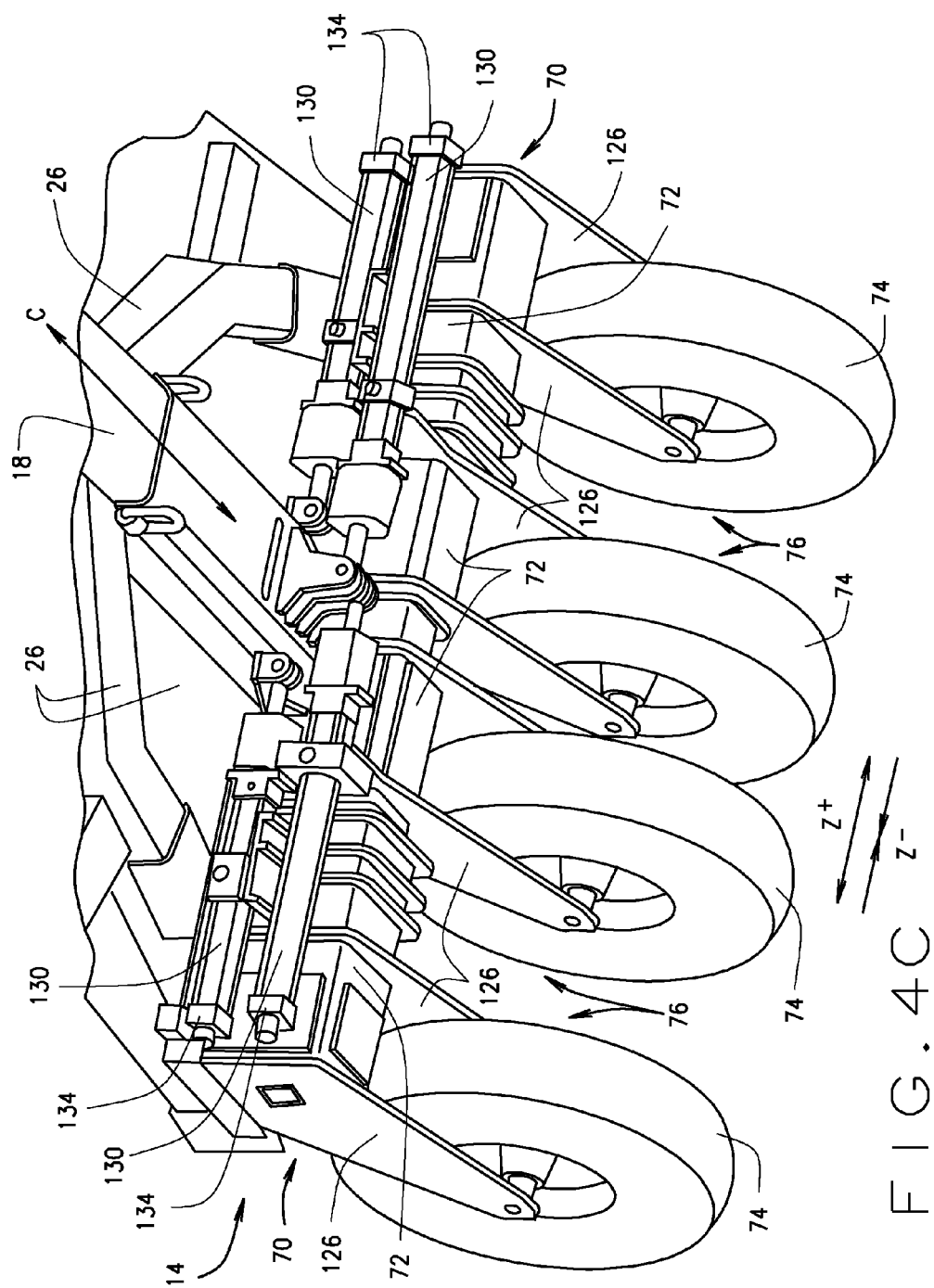
FIG. 4C is a bottom isometric view of the telescopic axle shown in FIGS. 4A and 4B illustrating hydraulic cylinders that control expansion and retraction of the telescopic axle such that the cart wheels can be set to any desired spacing, in accordance with various embodiments of the present disclosure.

Referring now to FIGS. 4A, 4B and 4C, in various embodiments, the adjustable wheel-axle assembly 14 includes a hollow hybrid telescoping support axle 70 and a plurality of wheel assemblies 76 mounted to the telescoping support axle 70. Each wheel assembly 76 generally includes a pair of fork arms 126 that are connected at proximal ends to the telescoping support axle 70 and have a respective one of the wheels 74 rotationally mounted between the respective distal ends of the fork arms 126. The telescoping support axle 70 is structured and operable to telescopingly extend and retract to adjust the spacing between the wheels 74 to any desired distance, thereby allowing the support cart 50 to achieve an array of wheel track spacings that coordinate with the desired row spacing configuration of the row units 30.

The telescoping support axle 70 includes a plurality of concentric sections 72 (best shown in FIG. 4C) that are telescopingly disposed within each other and operatively interconnected via a plurality of actuators 130, e.g., hydraulic cylinders. That is, each actuator 130 is operable to control the extension and retraction of a respective one of the concentric sections 72 such that each section 72 can be extended and retracted independent of the other sections 72. However, although each actuator 130 is operable to independently control the movement of one respective section, two or more actuators can be actuated substantially simultaneously such that two or more concentric sections 72 are extended substantially simultaneously, retracted substantially simultaneously, or extended and retracted substantially simultaneously (i.e., one section 72 can be extended while substantially simultaneously another sections 72 is retracted.

As used herein, with regard to the telescoping support axle 70 and concentric sections 72, 'extended' will be understood to mean movement outward orthogonally away from the center axis C in the $Z^+$ directions, and 'retracted' will be understood to mean movement inward orthogonally toward from the center axis C in the $Z^-$ directions.

Moreover, each concentric section 72 has a respective one of the wheel assemblies 76 mounted thereto such that each respective wheel assembly 76 is independently moveable in the $Z^+$ and $Z^-$ directions as a result of the respective concentric section 72, via the actuators 130, as described above. Hence, during planting operations, when the planter 10 is in the Planting Configuration, each wheel 74 can be positioned to track between a pair of row units 30 so that the ground that is to be tilled and sewn via the row units 30 is not compacted by the support cart wheels 74 that bear the weight of the support cart 50 and toolbar assembly 46 (as illustrated in FIG. 4B). Particularly, when in the Planting Configuration, each wheel assembly 76 can be positioned at any desired distance away from the center axis C to provide stability to the support cart 50 and toolbar assembly 46 without interfering with the planting operations of the row units 30 as the planter 10 traverse a field. And, importantly, the wheel assemblies 76 can be retracted to place the planter 10 in the Transport Configuration such that a width H of the entire wheel axle assembly 14, including the telescoping support axle 70 and all the wheel assemblies 76, is less than or equal to the DOT maximum load width for which special 'Oversize' or 'Wide Load' permits are not required (as shown in FIG. 4A).

In various embodiments, each actuator 130 includes a position sensor 134 to provide position feedback data to a computer based control system (not shown) to control the extension and retraction of the respective actuator 130. For example, in various embodiments, each position sensors 134 can be linear transducers that generate analogue signals proportional to the extended stroke of the respective actuator 130. In such embodiments, each transducer 134 outputs a signal (e.g., a 4-20 mA signal) which operation software, executed by the computer based control system, converts to a spacing distance between the wheels 74 such that the spacing between the wheel 74 can be controlled and set to any desired distance. Execution of the operation software controls many or all the operations of the main toolbar assembly 46 and support cart 50. For example, in various implementations, an operation software interface of the control system is utilized to input a desired spacing between all adjacent wheels 74. Once the desired spacing is input, execution of the operation software can begin, whereby the actuators 130 are actuated and extension and/or retraction of one or more of the support axle concentric sections 72 begins. Subsequently, the transducers 134 transmit extension and/or retraction valves to the control system to create a simple control loop that runs until the desired spacing between all adjacent wheels 74 is obtained.

For example, in various embodiments, the wheel axle assembly 14 can include four wheel assemblies 76, the telescoping support axle 70 can comprise a stationary central section 72 and four telescopic concentric sections 72 (i.e., two concentric sections disposed on each of opposing halves of the central section) and the wheel axle assembly 14 can further comprise four actuators 130, wherein each actuator 130 is operable to impart movement to a respective one of the four telescopic sections 72. That is, two inner actuators 130 are structured and operable to move two inner sections 72 (i.e., support axle sections 72 that are telescopingly disposed on central section 72 and located nearer the center axis C than the remaining two outer sections 72), and two outer actuators 130 are structured and operable to move two outer sections 72 (i.e., support axle sections 72 that are telescopingly disposed on two inner sections 72 and located further from the center axis C than the two inner sections 72).

In such embodiments, to position the respective wheel assemblies/wheels 76/74 at the desired spacing, the operation software first instructs the inner actuators 130 to begin extending the inner concentric sections 72 and the corresponding wheel assemblies 76 outward. In such embodiments, extension of inner concentric sections 72 will cause the outer concentric sections 72, respective outer wheels 74, and respective outer actuators 130 to also be moved outward. Once the transducers 134 of the inner actuators 130 indicated that the inner wheels are positioned at the desired distance from the center axis C, the operation software deactivates and locks the inner actuators 130 at the desired location. Subsequently, the operation software instructs the outer actuators 130 to begin extending the outer concentric sections 72 and the corresponding wheel assemblies 76 outward until the outer wheels 74 are at the desired distance from the inner wheels 74, at which point the operation software deactivates and locks the outer actuators 130.

Alternatively, any other suitable sequence of actuator 130 activation and corresponding wheel assembly 76 positioning can be implemented and remain within the scope of the invention. For example, wheel assembly 76 positioning can be implemented by positioning a first side of inner and outer wheel assemblies 76 (as described above) then repeating the operation for the opposing second side of inner and outer wheel assemblies 76. Or, the inner and outer actuators 130 can be operated simultaneously such that the inner and outer wheel assemblies 76 are being extended relative to the center axis C and relative to each other simultaneously.

Additionally, although the position sensors 134 that control the operation of the actuators 130, i.e., the controlled extension and retraction of the actuators 130, have been described above as linear transducers, the position sensors be any other device suitable for providing position feedback and remain within the scope of the present disclosure. For example, in various embodiments digital detection sensors can be used to confirm position of the actuators 130, and hence the wheel assemblies 76, at a predetermined set location. Additionally, other analog sensors might also be possible for position location sensing of the actuators 130, e.g., magnetorestrictive sensors or any other suitable position sensing technology.

Figure 5A:
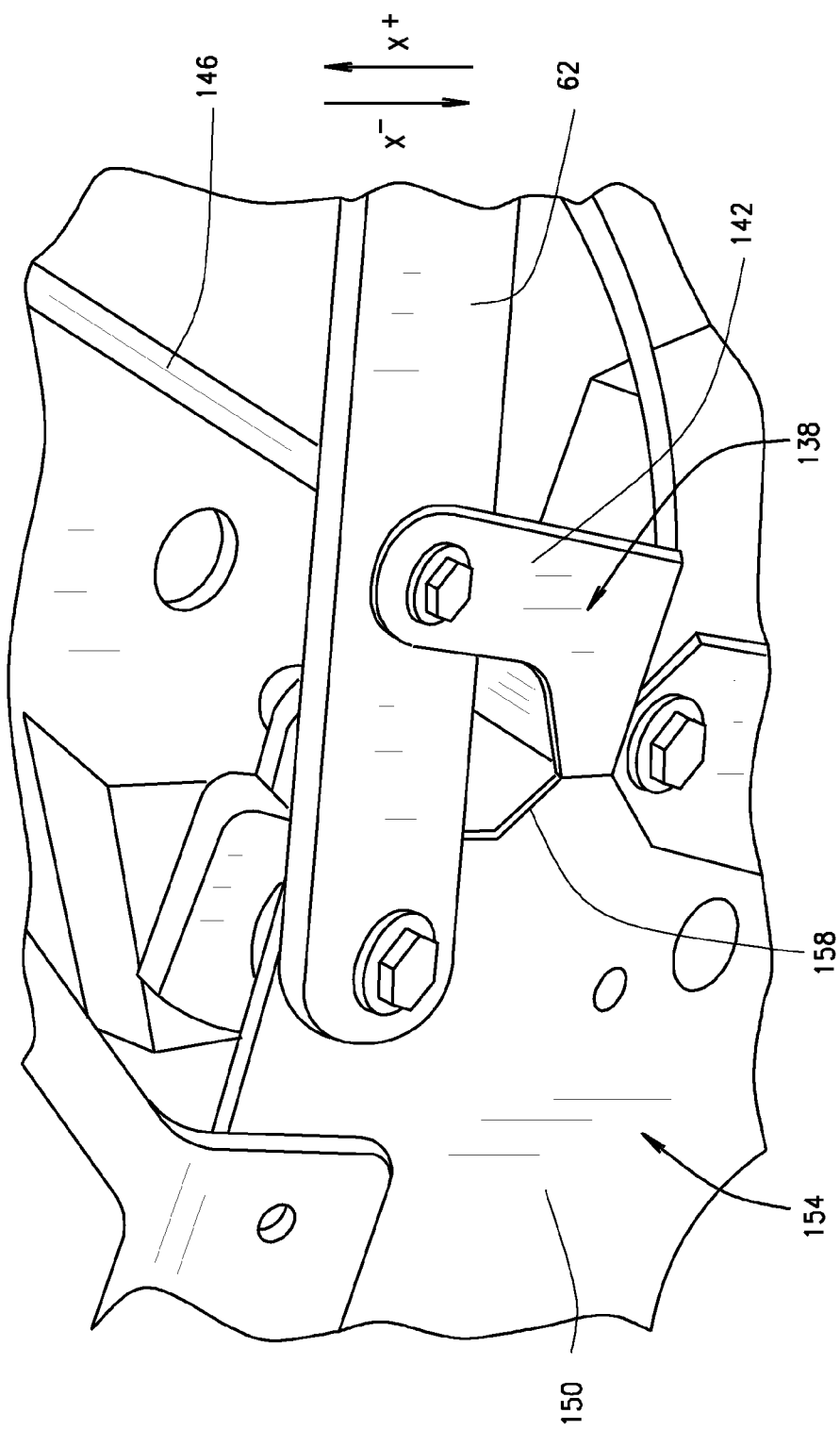
FIG. 5A is an illustration of a row unit lock bar of the of the transformable agricultural plot planter shown in FIG. 1A in a 'Locked Position' for locking the row units in a fixed position such that the row units can be utilized as jack stands to lift a wheel axle assembly of the support cart off the ground, in accordance with various embodiments of the present disclosure.
Figure 5B:
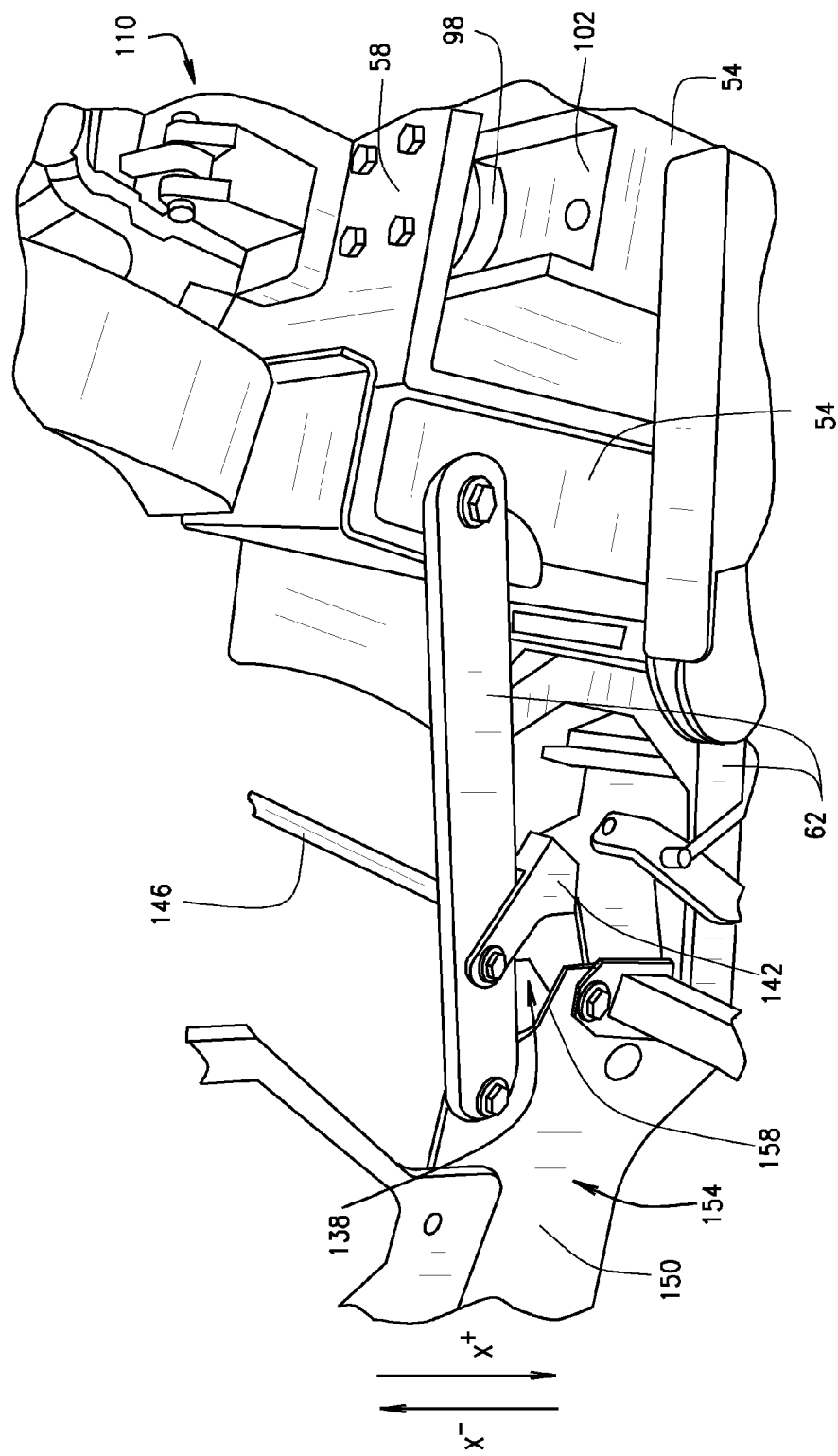
FIG. 5B is an illustration of the row unit lock bar shown in FIG. 5 in an 'Unlocked Position', in accordance with various embodiments of the present disclosure.

Now referring to FIGS. 5A and 5B, in various embodiments, the row units 30 can be utilized as jack stands to lift the wheels 74 of the wheel-axle assembly 14 off the ground so that the spacing between the wheels 74 can be set to any desired distance, via the telescoping support axle 70, as described above. In such embodiments, the main toolbar assembly 46 includes a lock bar 138 that is structured and operable to selectively place a plurality or all of the row units 30 in a 'Jack Stand Configuration' wherein the row units 30 are placed in a fixed position relative to the row unit mounting beam 54 and the main toolbar beam 56. Specifically, when the row units 30 are placed the Jack Stand Configuration, via the lock bar 138, the respective row units 30 are locked in a rigid connection with the respective suspension arms 62 such that the respective row units 30 are a rigid extension of the main toolbar beam 56, i.e., the respective row units 30 cannot move up and down in the $X^+$ and $X^-$ directions. Thus, when the respective row units 30 are placed in the Jack Stand Configuration, and a downward force in the $X^+$ direction (shown in FIG. 3A) is applied to the row unit mounting beam 54, via the toolbar lift and spin assembly 34, substantially equal force with be transmitted to the ground, via the respective row units 30.

As described above, the toolbar lift and spin assembly 34 is connected to the main toolbar beam 56. Furthermore, the toolbar lift and spin assembly 34 is connected to the wheel-axle assembly 14, via the base cradle 38 and work deck 26. Therefore, when the planter 10 is in the Planting Configuration, and the respective row units 30 are in the Jack Stand Configuration, the toolbar lift and spin assembly 34 can be operated to exert a downward force in the $X^+$ direction to main toolbar beam 56, and hence to the respective row units 30, such that the wheel-axle assembly 14 is lifted off the ground, allowing the wheels assemblies/wheels 76/74 to be placed at any desired spacing, as described above.

The lock bar 138 includes a plurality of lock wedges 142 pivotally connected to the upper suspension arms 62 of a plurality or all of the row units 30. The lock wedges 142 are interconnected by one or more connecting rods 146 such that all of the lock wedges 142 connected to each respective connecting rod 146 can simultaneously be moved between an 'Unlocked Position' (shown in FIG. 5B) and a 'Locked Position' (shown in FIG. 5A). When the lock wedges 142 are in the Unlocked Position the respective row units 30 are able to float, i.e., freely move up and down in the $X^+$ and $X^-$ directions, with the contour of the ground as the planter 10 traverses a field. Conversely, when the lock wedges 142 are in the Locked Position the respective row units 30 are placed in the Jack Stand Configuration, wherein the respective row units 30 are prevented from floating, i.e., prevented from moving up and down in the $X^+$ and $X^-$ directions, and become a rigid extension of the main toolbar beam 56, as described above.

More specifically, opposing side panels 150 of a frame 154 of the planter head 66 of each respective row unit 30 includes a lock wedge receiver 158 that is structured and operable to receive a respective one of the lock wedges 142. As described above, each lock wedge 142 is pivotally connected to the upper suspension arms 62 of the respective row units 30. To place respective row units 30 in the Jack Stand Configuration, the lock wedges 142 are pivoted, via manual or automated manipulation of the connecting rod(s) 146, from the Unlocked Position (shown in FIG. 5B) to the Locked Position (shown in FIG. 5A) such that each lock wedge 142 is disposed within the respective lock wedge receiver 158.

When the lock wedges 142 are disposed within the respective lock wedge receivers 158 and downward force in the $X^+$ direction is applied to the main toolbar beam 56, the lock wedges 142 bind within the lock wedge receivers 158 and provide a wedge or block between the respective row unit frame side panels 150 and the respective upper suspension arms that prevent the respective row units 30 from moving up and down in the $X^+$ and $X^-$ directions, and convert the respective row units 30 into rigid extensions of the main toolbar beam 56, whereby the respective row units 30 can be utilized as jack stands to lift the wheel-axle assembly 14 off the ground, as described above.

To return the respective row units 30 to the Planting Configuration, the main toolbar beam 56 is raised in the $X^-$ direction to remove the $X^+$ direction force from the respective row units 30 and restore the bearing of the weight of the planter 10 to the wheel-axle assembly 14. Subsequently, the lock wedges 142 can be manually or automatically removed from the lock wedge receivers 158, thereby allowing the respective suspension arms 62 to freely move up and down in the $X^+$ and $X^-$ directions such that the corresponding row units 30 can also freely move up and down in the $X^+$ and $X^-$ directions, i.e., float, with the contour of the ground as the planter 10 traverses a field.

Referring now to FIGS. 2B, 2C, 2F, 2G and 4A through 5B, in various embodiments, the toolbar lift and spin assembly 34 includes a sensor feedback system that monitors the operation of the toolbar lift and spin assembly 34. Particularly, the sensor feedback system insures that the toolbar lift and spin assembly 34 retains the wheel assemblies 76 off the ground while the row units are being utilized as jack stands and the spacing between the wheel assemblies/wheels 76/74 is being adjusted. More specifically, the toolbar lift and spin assembly 34 includes one or more sensors that monitor the position of the lift arm assemblies 42 when the row units 30 are used as jack stands to lift the wheel-axle assembly 14 off the ground. The sensors provide feedback information to the control system regarding the position of the lift arm assemblies 42 so that, as the row units 30 are holding the wheel-axle assembly 14 off the ground, if lift arm assemblies 42 start to let the wheel-axle assembly 14 creep down, the control system will stop the adjustment of the wheel assemblies 76/wheels 74 and raise the wheel-axle assembly 14 back to the desired height, via the lift arm assemblies 42.

Additionally, in various embodiments, the operation software includes various software interlocks that only allow certain planter operations, adjustments and setting to be performed after other specific operations, adjustments and setting have been completed. Therefore, operations, adjustments and settings of the planter 10 can only be performed in a designed sequence. Performing any and all of the operations, adjustments and setting described above in a designed sequence will prevent damage to the planter 10.

Furthermore, in various embodiments, each row unit 30 can be structured and operable to lock the respective planter head 66 in an 'Up' position or a 'Down' position. More specifically, in such embodiments, the parallel suspension arms 62 of each row unit 30 are structured and operable to lock the respective planter head 66 in the Up position or in the Down position. When locked in the Up position, the respective row unit 30 is not utilized to plant seed as the planter 10 traverses the field. Conversely, when locked in the Down position, the respective row unit 30 can be used as a jack stand, as described above. Or, when not locked in the Up or Down position, the respective row unit 30 is operable float up and down $X^-$ and $X^+$ directions and be utilized to plant seed as the planter 10 traverses the field. Hence, by providing the capability to lock selected row units 30 in Up position, the planter 10 is structured and operable to provide further alternative row spacing configurations.

Additionally, as described above, it is envisioned that in various embodiments the footprint and spacing of the wheels of the tractor 22 can be adjustable for quickly adjusting the tractor 22 wheels in the field to match a desired row spacing configuration. For example, in various embodiments, the tractor 22 can include zinc plated rear axles that allow for easy sliding of wheel hubs to different wheel track settings, a loader attachment for changing the front rims efficiently, and a specially outfitted tool kit. The tool kit can include such tools as a pneumatic jack, portable air compressor, torque wrench, correct size sockets, tape measure, jack stands, jack blocks, and several other tools. Accordingly, the rear tires can be adjusted to the desired track setting by lifting the rear tire and hub assemblies off the ground loosening the tire and hub assemblies from the axles, sliding the tire and hub assemblies to the desired setting and then refastening the tire and hub assemblies from the axles. The front wheel track can be adjusted by selecting the front tire and rim assembly for the desired track setting and using the loader to raise the front end of the tractor and support with jack stands while the tire and rim assemblies are changed to the selected ones.

Furthermore, in various embodiments, the planter 10 and/or tractor 22 can include a global positioning system (GPS) to assist the driver of the tractor 10 in, or alternatively completely automated, guiding the planter 10 through the field and automating operations of the planter 10 such as controlling the seed to be planted and tracking the planted seed to their specific locations within the field. Moreover, in various implementations, it is envisioned that the planter 10 and tractor 22 can utilize the GPS in cooperation with the operation software to such that the planter 10 and tractor 22 can be unmanned, fully programmable, and the planter 10 operations traceable such that the planting position of every seed in a field could be preset and easily traced back to the plant which is subsequently harvested at that location.

Figure 6A:
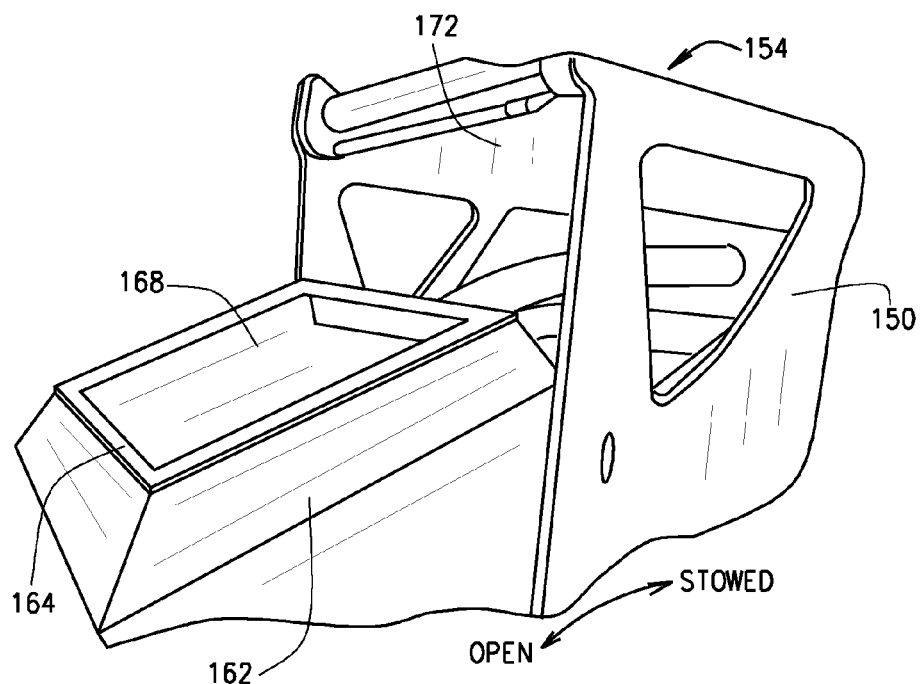
FIG. 6A is a side view of a treatment bin of the transformable agricultural plot planter shown in FIG. 1A, in accordance with various embodiments of the present disclosure.
Figure 6B:
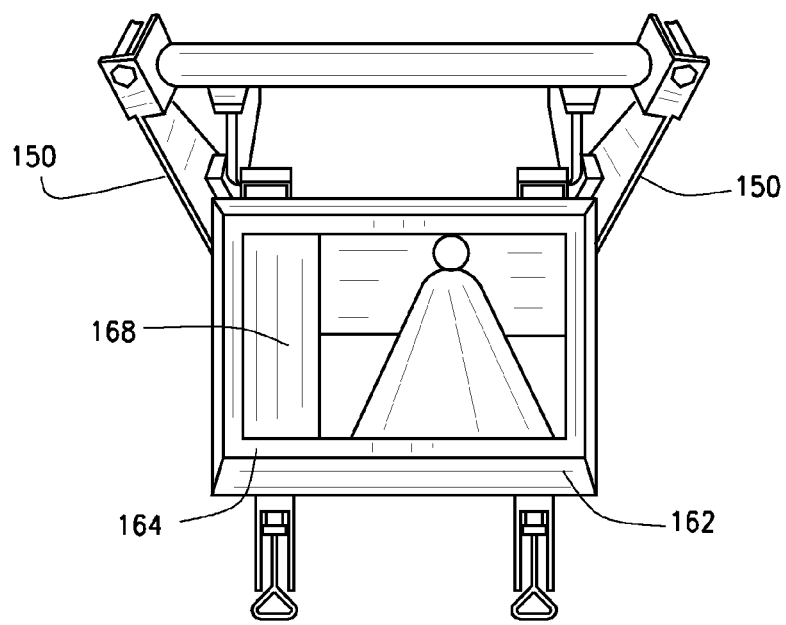
FIG. 6B is a top view of the treatment bin shown in FIG. 6A, in accordance with various embodiments of the present disclosure.

Referring now to FIGS. 6A and 6B, in various embodiments, the planter head 66 of each row unit 30 includes a treatment bin 162 pivotally disposed between the side panels 150 of the respective planter head frame 154. Each treatment bin 162 is pivotally connected between the respective side panels 150 such that the treatment bin 162 can be pivoted (manually or automatically) between a Stowed position (not shown) and an Open position (shown in FIGS. 6A and 6B). Each treatment bin 162 is structured and operable to retain seed and provide the seed to the seed distribution system 86 of each respective planter head 66.

Importantly, the treatment bins 162 are located behind and/or below the main toolbar assembly 46 and pivot to the Open position toward the rear of the respective row unit 30 such that each treatment bin 162 can be filled with seed from behind the main toolbar assembly 46 and the respective row unit 30. Loading the treatment bins 162 from behind the main toolbar assembly 46 and respective row unit 30 reduces ergonomic and safety issues of operators lifting large bags of seed and/or planting treatment to face level, or higher, to fill the treatment bins 162. Thus, dust and residue from the seed and/or treatment chemistries do not fill the face of the operator loading the treatment bins 162.

In various implementations, each treatment bin 162 can include a gasket 164 disposed around a lip of a top opening 168 of the respective treatment bin 162. The gaskets 164 are structured and operable to seal the opening 168 with a top 172 of the respective planter head frame 154 such that a substantially water tight seal is formed to prevent rain and moisture from entering the respective treatment bin 162 when the respective treatment bin 162 is in the Stowed position.

Figure 7A:
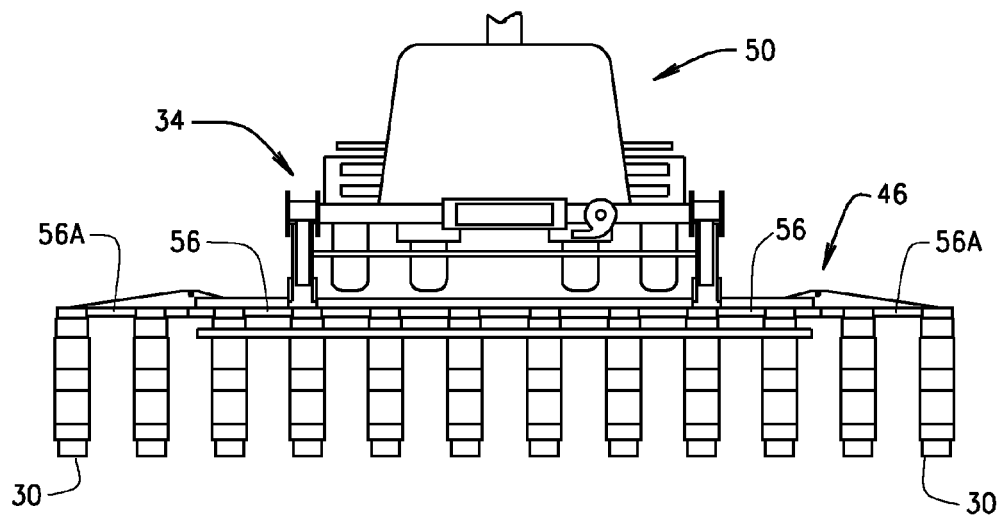
FIG. 7A is a top view of the transformable agricultural plot planter shown in FIGS. 1A through 6B including a sectioned main toolbar beam having retractable distal end sections in an extended configuration, in accordance with various embodiments of the present disclosure.
Figure 7B:
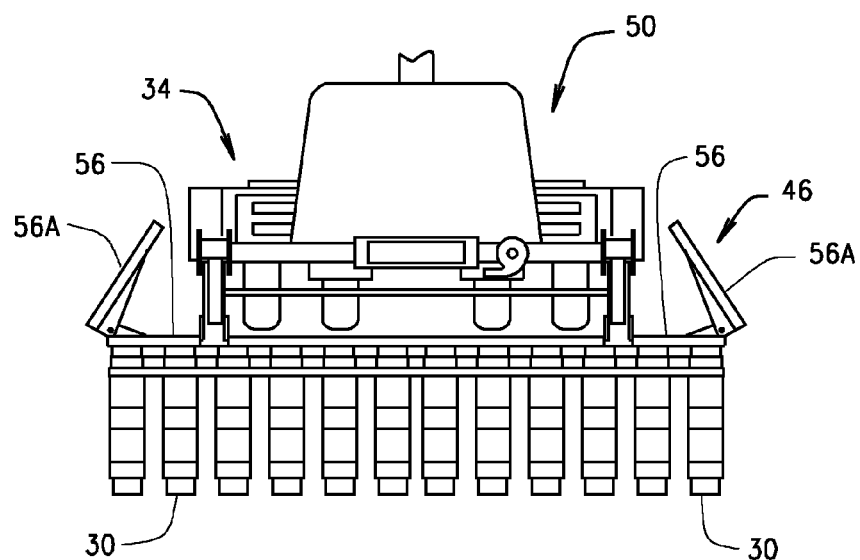
FIG. 7B is a top view of the transformable agricultural plot planter shown in FIG. 7A wherein the retractable distal end sections are in a retracted configuration, in accordance with various embodiments of the present disclosure.
Figure 7C:
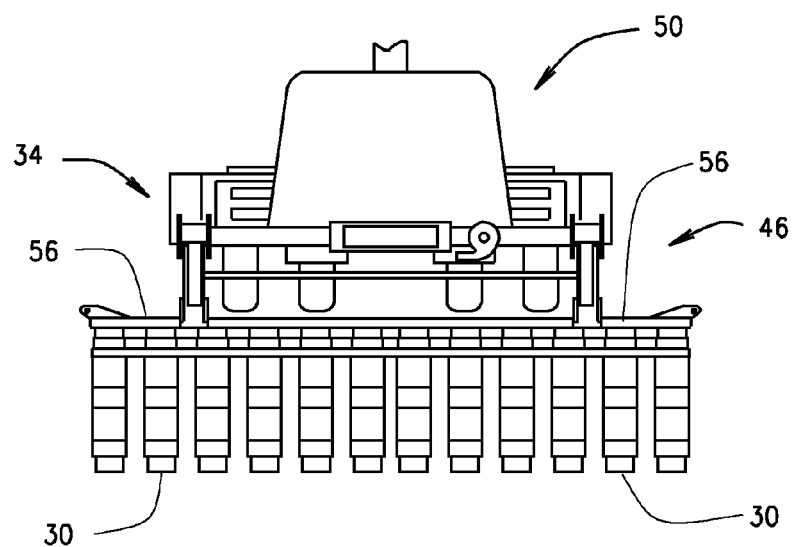
FIG. 7C is a top view of the transformable agricultural plot planter shown in FIGS. 7A and 7B wherein the retractable distal end sections are removed, in accordance with various embodiments of the present disclosure.

Referring now to FIGS. 7A, 7B and 7C, in various embodiments, the main toolbar beam 56 can comprise retractable and removable wings, i.e., the distal end sections, 56A. The wings 56A can have any desired length, e.g., 3 ft., 4 ft., ft., etc., and provide the opposing distal end sections of the main toolbar beam 56. In such embodiments, when the full length of the main toolbar beam 56 is needed to configure the planter 10 with the desired number of row units 30 and the desired row spacing between the row units 30, the wings 56A can be deployed in and extended position (as shown in FIG. 7A) to configure the main toolbar 56 to provide the full or total length on which the desired number of row units 30 can be disposed and spaced, as described above.

Alternatively, in such embodiments, wherein the full length of the main toolbar 56 is not needed to configure the planter 10 with the desired number and spacing of row units 30, the wings 56A can be folded back (automatically or manually) to a retracted position (as shown in FIG. 7B), thereby reducing the overall width of the main toolbar during operation of the planter 10 in the field and/or during transporting of the planter 10 when the planter 10 is in the Transport configuration. Additionally, in various instances where it is desirable to maintain a short length main toolbar 56 and/or it is desirable to lighten the weight of the planter 10, the wings 56A can be removed and stored for future use.

Figure 8:
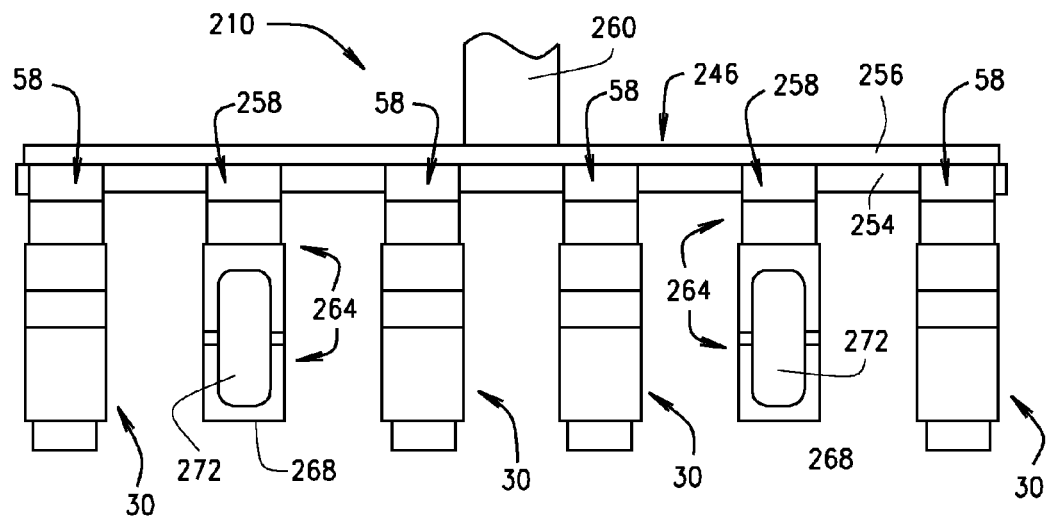
FIG. 8 is a schematic of a multi-row unit planter having support wheel adjustably mounted to the same toolbar as the row units, in accordance with various embodiments of the present disclosure.

Referring now to FIG. 8, it is envisioned that a flexible multi-row unit planter structured similar to the planter 10 described above, only without the need for the support cart 50 described above, can be utilized in various field applications. Specifically, it is envisioned that a flexible multi-row unit 110 can be structured to incorporate two to eight row units 30 for use in applications where a larger number of row units 30 and the multitude of possible configurations and planting densities are not desired or feasible.

In such embodiments, the flexible planter 210 includes a toolbar assembly 246 that includes a row unit mounting beam 254 mounted to a toolbar beam 256. A planter neck 260 is connected to the toolbar beam 256 and is structured and operable to connect to the tractor 22, or other suitable mobile platform, to pull the flexible planter 210 through the field as described above with regard to planter 10. Additionally, in such embodiments, the row units 30 are adjustably mounted to the row unit mounting beam 254 in the same manner as described above with regard to row unit mounting beam 54. Particularly, the row unit mounting beam 254 is structured and operable to slidingly accept the plurality of row unit carriage assemblies 58, wherein each row unit carriage assembly 58 is structured and operable to be movable and positionable (automatically or manually) anywhere along the length of the mounting beam 254. Moreover, each row unit carriage assembly 58 has connected thereto a respective one of the row units 30 (as described above) such that each of the row units 30 can be positioned and locked in place anywhere along the length of the mounting beam 254 such that any desired distance or spacing between row units 30 can be achieved.

Additionally, in such embodiments, a plurality of support wheel assemblies 264 are slidingly connected to the row unit mounting beam 254 in the same manner as the row units 30. The support wheel assemblies 264 are structure and operable to support the weight of the toolbar assembly 246 and row units 30 as the flexible planter 210 is pulled through a field. Each support wheel assembly includes a frame 268 structured and operable to rotatably retain a support wheel 272. Each frame 268 is mounted to a support wheel carriage assembly 258 that is the same in structure and function as the row unit carriage units 68 described in detail above. Accordingly, each support wheel carriage assembly 258 is structured and operable to be movable and positionable (automatically or manually) anywhere along the length of the mounting beam 254. Moreover, each support wheel carriage assembly 258 has connected thereto a respective one of the support wheel frames 268 such that each of the support wheel frames and wheels 268/272 can be positioned and locked in place anywhere along the length of the mounting beam 254. Therefore, each support wheel assembly 264 can be positioned between, or next to, adjacent row units 30 such compaction of the soil by each respective support wheel 272 is evenly distributed to each adjacent furrow as the flexible planter 210 is pulled through the field.

Referring now to FIGS. 9A through 9D, in various embodiments, the toolbar lift and spin assembly 34 includes one or more ram locks 176 that are structured and operable to prevent one or more hydraulic cylinders 180 of the toolbar lift and spin assembly 34 from compressing when a ram shaft 184 of the respective cylinder 180 is extended. More specifically, each lift arm assembly 42 generally comprises an upper lift arm 42A and a lower lift arm 42B that are pivotally connected to the base cradle 38 and a hydraulic cylinder 180 connected at one end to the base cradle 38 and at the opposing end to the upper or lower lift arm 42A or 42B. Particularly, the hydraulic cylinder 180 includes a ram shaft 180A (best shown in FIG. 9B) slidingly disposed within a hydraulic body 180B, wherein a distal end of the ram shaft 180A is connected to one of the upper or lower lift arms 42A or 42B and a distal end of the hydraulic body 180B is connected to the base cradle 38. Alternatively, the ram shaft 180A can be connected to the base cradle 38 and the hydraulic body 180B can be connected 38 to one of the upper or lower lift arms 42A or 42B. The hydraulic cylinder 180 is structured and operable to extend and retract the ram shaft 180A to move the main toolbar assembly 46 and row units 30 between a raised and stowed position (FIG. 9B) and a lowered and deployed position (FIG. 9D). When in the raised and stowed position, with the ram shaft 180A retracted, the main toolbar assembly 46 and row units 30 are positioned to place the planter 10 in the Transport Configuration (FIG. 9B), and when in the lowered and deployed position, with the ram shaft 180A extended, the main toolbar assembly 46 and row units 30 are positioned to place the planter 10 in the Planting Configuration (FIG. 9D).

The ram stop 176 is pivotally connected to the distal end of the ram shaft 180A and/or to the respective upper or lower lift arm 42A or 42B (or alternatively the base cradle 38). The ram stop 176 includes a first stopping collar 184 pivotally disposed within a second stopping collar 188, a lever arm 192 connected to a proximal end of the second stopping collar 188, a biasing device 196 connected between a tail 184A of the first stopping collar 184 and the second stopping collar 188, and an actuator 190 (e.g., a pneumatic actuator) connected between the lever arm 192 and the respective upper or lower lift arm 42A or 42B. The first stopping collar 184 has C-shaped cross-section such that it can be disposed around the ram shaft 180A when the ram stop 176 is placed in a first stop position, as shown in FIG. 9C. The second stopping collar 188 also has a C-shaped cross-section and is structured to fit over and enclose the first stopping collar 184 when the ram stop 176 is placed in a second stop position, as shown in FIG. 9D.

The biasing device 196 can be any biasing device suitable to exert a constant pulling force on the tail 184A of the first stopping collar 184 toward the point where the biasing device is connected to the second stopping collar 188, e.g., a spring or pneumatic actuator. More particularly, the constant pulling force exerted by the biasing device 196 biases the first stopping collar 184 away from, or out from within, the second stopping collar 188, as shown in FIG. 9E. The actuator 190 is structured and operable to extend and retract to control the positioning of the ram stop 176. Specifically, the actuator 190 can be operated to extend such that the lever arm 192 is pushed away from a longitudinal center of the actuator 190, thereby positioning the first and second stopping collars 184 and 188 away from the ram shaft 180A such that the ram shaft 180A can be retracted within the hydraulic body 180B to a home position, whereby the main toolbar assembly 46 and row units 30 are placed in the raised and stowed position (FIG. 9B). Conversely, when the ram shaft 180A is extended, the actuator 190 can be operated to retract such that the lever arm 192 is pulled toward the longitudinal center of the actuator 190, thereby positioning ram stop 176 in the first stop position, wherein the first stopping collar 184 prevents the ram shaft 180A from being fully retracted or compressed within the hydraulic body 180B, as shown in FIG. 9C. Furthermore, when the ram shaft 180A is further extended to place the main toolbar assembly 46 and row units 30 in the lowered and deployed position, the actuator 190 can be operated to further retract such that the lever arm 192 is pulled further toward the longitudinal center of the actuator 190, thereby positioning ram stop 176 in the second stop position, wherein the second stopping collar 184 prevents the ram shaft 180A from being retracted or compressed within the hydraulic body 180B, as shown in FIG. 9D.

Accordingly, in operation, when each hydraulic cylinder 180 is operated to extend the respective ram shaft 180A out of, or away from, the respective hydraulic body 180B to move the main toolbar assembly 46 and row units 30 from the raised and stowed position to a semi-deployed position (e.g., a position half way between the raised and stowed position and the lowered and deployed position), each actuator 190 can be actuated to move the respective first stopping collar 184 into the first stop position (FIG. 9C) to prevent retraction or compression of the respective ram shaft 180A back into the respective hydraulic body 180B. Subsequently, when each hydraulic cylinder 180 is operated to further extend the respective ram shaft 180A out of, or away from, the respective hydraulic body 180B to fully move the main toolbar assembly 46 and row units 30 to lowered and deployed position, each actuator 190 can be actuated to move the respective second stopping collar 184 into the second stop position (FIG. 9D) to prevent retraction or compression of the respective ram shaft 180A back into the respective hydraulic body 180B. Hence, each ram stop 176 provides a safety lock that prevents unintentional retraction or compression of the respective ram shaft 180A back into the respective hydraulic body 180B once the main toolbar assembly 46 and row units 30 have been placed in the semi-deployed position or the fully lowered and deployed position.

The planter 10, as described herein is useful for many row planting scenarios. For example, the planter 10 can be used for planting research experiments for several different crops. Different row widths result in different outcomes on yield as well as many agronomic features including stand ability and resistance to stresses. The ability to quickly and easily change from one row width to the other in the field will give crop researchers the flexibility to try the configurations that are best suited to different geographic regions and varieties. The planter 10, as described herein, offers an advantage over existing technology because it does not require multiple planters in order to plant different row spacings, and it provides the flexibility to have greater than eight row units 30 on a given planter, which results in greater productivity.

As described above, the design of the main toolbar assembly 46 enables the planter 10 to be scaled to any number of row units 30 desired and to provide a wide range of spacing configuration options for the use. For example, the planter 10 can be scaled to utilize 1, 2, 3, 4, 5, 6, 7, 8, 9, 10, 11, 12 or more row units 30 having generally any desired row spacing. Particularly, the ability of the planter 10 to be set up with 12 row units 30 provides many planting configurations that known 6-row and 8-row planters cannot provide.

For example, adjustable 6-row planters are well suited to plant test plots with 60" total plot width having two 30" or three 20" rows, but are not as efficient for planting other test plot sizes, such as plots with an 80" total width. Similarly, adjustable 8-row planters, can plant two 40" rows for an 80" plot, and three 20" rows for a 60" plot, but are not efficient for planting three 20" rows for a 60" plot. Conversely, the planter 10, as described above, configured with 12 row units 30, can be utilized to plant plots with 60" or 80" total row widths, and further divide each plot into rows in a way that does not leave a row unit 30 idle. For example, the planter 10 having 12 row units 30 can be configured to plant 4 three-row plots having a 20" spacing, whereby all 12 row units 30 are utilized and none are left idle. However, a known 4-row planter can only plant a single three-row plot having 20" spacing, whereby one of the row units is not utilized and left idle. Similarly, a known 8-row planter can only plant 2 three-row plots having 20" spacing, whereby two of the row units are not utilized and left idle.

As a further example, the planter 10 having 12 row units 30 can be configured to plant 3 four-row plots, where again all 12 row units 30 are utilized and none are left idle. However, a known 8-row planter can only plant 2 four-row plots. Still further, the planter 10 having 12 row units 30 can be configured to plant 2 six-row plots, whereby all 12 row units 30 are utilized and none are left idle. However, a known 4-row planter cannot be used for 6-row plots and a known 8-row plant can only plant 1 six-row plot, whereby two of the row units are not utilized and left idle. Thus, the planter 10 having 12 row units 30 provides greater plot configuration flexibility and greater efficiency when planting two-row plots, three-row plots, four-row plots, and six-row plots than known 4-row and 8-row planters. Hence the planter 10 has applications for farmers and growers as well as researchers. In one embodiment of this invention, seed manufacturers can use this planter 10 to determine optimum row widths for a given cultivar or hybrid through repeated testing, then farmers can use the planter 10 to adjust row widths to match.

In summary, the planter 10 can suspend the main toolbar assembly 46, including the row units 30, behind the support cart wheels 74 for planting operations. Then, when it is time to transport the planter 10 to a new location, the "lift and spin" design lifts the toolbar lift and spin assembly 34 and toolbar assembly 46 back over the support cart wheels 74, rotates them 90°, and centers them over the support cart 50 such that the width of the entire planter 10 including the support cart wheel-axle assembly 14, toolbar lift and spin assembly 34, entire toolbar assembly 46 and associated seed supply bins do not exceed DOT standard load width limitations, thereby eliminating the need for 'Oversize' or 'Wide Load' permits from the DOT to transport the planter 10 on United States highways.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A transformable agricultural planter, said planter comprising:
    a support cart including a telescopic wheel-axle assembly, the telescopic wheel-axle assembly comprising:
        a telescoping support axle having a plurality of wheel assemblies mounted thereto; and
        a plurality of actuators connected to the telescoping support axle and operable to extend and retract the telescoping support axle such that a spacing between the wheel assemblies can be set to any desired distance between a minimum and maximum length of the telescoping support axle as defined by the structural dimensions and operational limitations of the telescoping support axle;
    a toolbar lift and spin assembly rotatably mounted to the support cart; and
    a main toolbar assembly connected to the toolbar lift and spin assembly, the toolbar lift and spin assembly structured and operable to rotate, raise and lower the main toolbar assembly between a transport configuration and a planting configuration.

2. The planter of claim 1, wherein the telescopic wheel-axle assembly comprises a plurality of concentric sections telescopingly disposed with each other, wherein the wheel assemblies are connected to the concentric sections and the actuators operatively interconnecting the concentric sections, and each actuator is operable to extend and retract a respective one of the concentric sections such that each concentric section can be extended and retracted independently of the other concentric sections.

3. The planter of claim 1, wherein each actuator comprises a linear transducer for controlling operation of the respective actuator such that the spacing between the wheel assemblies can be controlled and set.

4. The planter of claim 1, wherein the toolbar lift and spin assembly comprises a sensor feedback system that monitors the operation of the toolbar lift and spin assembly.

5. The planter of claim 1, wherein the main toolbar assembly comprises:
    a row unit mounting beam connected to the toolbar lift and spin assembly;
    a plurality of row unit carriage assemblies slidingly mounted to the row unit mounting beam; and
    a plurality of row units, each row unit oscillatingly connected to a respective one of the carriage assemblies such that each row unit can be moved along the mounting beam and retained in a desired location along the mounting beam so that the row units can be variably spaced apart from each other.

6. The planter of claim 5, wherein each row unit is connected to the carriage assembly via a plurality of suspension arms, and each carriage assembly comprises a lever locking mechanism including lever, a locking pin and a friction plate that are cooperable to retain the respective carriage assembly and row unit at the desired location along the row unit mounting beam.

7. The planter of claim 5, wherein the main toolbar assembly comprises a lock bar structured and operable to selectively place a plurality of the row units in a rigid connection with the row unit mounting beam such that the row units can be utilized as jack stands to lift the support cart wheel assemblies off the ground.

8. The planter of claim 5, the plurality of row units comprised twelve row units.

9. The planter of claim 1, wherein the support cart further comprises a telescoping neck structured and operable to connect the planter to a mobile platform.

10. The planter of claim 1, wherein the support cart, the toolbar lift and spin assembly and the main toolbar assembly are structured and operable to cooperatively transform the planter from the planting configuration to the transport configuration wherein a width of the planter in the transport configuration is less than or equal to a maximum load width defined by a Department Of Transportation for which special 'Wide Load' permits are not required.

11. A transformable agricultural planter, said planter comprising:
    a support cart including a telescopic wheel-axle assembly, the telescopic wheel-axle assembly comprising:
        a telescoping support axle comprising a plurality of concentric sections telescopingly disposed with each other;
        a plurality of wheel assemblies connected to the concentric sections; and
        a plurality of actuators operatively interconnecting the concentric sections, and each actuator is operable to extend and retract a respective one of the concentric sections such that each concentric section can be extended and retracted independently of the other concentric sections to set a spacing between the wheel assemblies to any desired distance between a minimum and maximum length of the telescoping support axle as defined by the structural dimensions and operational limitations of the telescoping support axle;

a toolbar lift and spin assembly rotatably mounted to the support cart; and a main toolbar assembly connected to the toolbar lift and spin assembly, the toolbar lift and spin assembly structured and operable to rotate, raise and lower the main toolbar assembly between a transport configuration and a planting configuration.

12. The planter of claim 11, wherein each actuator comprises a linear transducer for controlling operation of the respective actuator such that the spacing between the wheel assemblies can be controlled and set.

13. The planter of claim 11, wherein the toolbar lift and spin assembly comprises a sensor feedback system that monitors the operation of the toolbar lift and spin assembly.

14. The planter of claim 11, wherein the main toolbar assembly comprises:
 a row unit mounting beam connected to the toolbar lift and spin assembly;
 a plurality of row unit carriage assemblies slidingly mounted to the row unit mounting beam; and
 a plurality of row units, each row unit oscillatingly connected to a respective one of the carriage assemblies such that each row unit can be moved along the mounting beam and retained in a desired location along the mounting beam so that the row units can be spaced apart from each other.

15. The planter of claim 14, wherein each row unit is connected to the carriage assembly via a plurality of suspension arms, and each carriage assembly comprises a lever locking mechanism including lever, a locking pin and a friction plate that are cooperable to retain the respective carriage assembly and row unit at the desired location along the row unit mounting beam.

16. The planter of claim 14, wherein the main toolbar assembly comprises a lock bar structured and operable to selectively place a plurality of the row units in a rigid connection with the row unit mounting beam such that the row units can be utilized as jack stands to lift the support cart wheel assemblies off the ground.

17. The planter of claim 11, wherein the support cart further comprises a telescoping neck structured and operable to connect the planter to a mobile platform.

18. The planter of claim 11, wherein the support cart, the toolbar lift and spin assembly and the main toolbar assembly are structured and operable to cooperatively transform the planter from the planting configuration to the transport configuration wherein a width of the planter in the transport configuration is less than or equal to a maximum load width defined by a Department Of Transportation for which special 'Wide Load' permits are not required.

19. A transformable agricultural planter, said planter comprising:
 a support cart including a telescopic wheel-axle assembly, the telescopic wheel-axle assembly comprising:
  a telescoping support axle comprising a plurality of concentric sections telescopingly disposed with each other;
  a plurality of wheel assemblies connected to the concentric sections; and
  a plurality of actuators operatively interconnecting the concentric sections, and each actuator is operable to extend and retract a respective one of the concentric sections such that each concentric section can be extended and retracted independently of the other concentric sections to set a spacing between the wheel assemblies to any desired distance between a minimum and maximum length of the telescoping support axle as defined by the structural dimensions and operational limitations of the telescoping support axle;
 a toolbar lift and spin assembly rotatably mounted to the support cart; and
 a main toolbar assembly connected to the toolbar lift and spin assembly and comprising:
  a row unit mounting beam connected to the toolbar lift and spin assembly;
  a plurality of row unit carriage assemblies slidingly mounted to the row unit mounting beam;
  a plurality of row units, each row unit oscillatingly connected to a respective one of the carriage assemblies such that each row unit can be moved along the mounting beam and retained in a desired location along the mounting beam so that the row units can be spaced apart from each other; and
  a lock bar structured and operable to selectively place a plurality of the row units in a rigid connection with the row unit mounting beam such that the row units can be utilized as jack stands to lift the support cart wheel assemblies off the ground,
 wherein the toolbar lift and spin assembly structured and operable to rotate, raise and lower the main toolbar assembly between a transport configuration and a planting configuration.

20. The planter of claim 19, wherein each row unit is connected to the carriage assembly via a plurality of suspension arms, and each carriage assembly comprises a lever locking mechanism including lever, a locking pin and a friction plate that are cooperable to retain the respective carriage assembly and row unit at the desired location along the row unit mounting beam.

21. The planter of claim 19, wherein the support cart, the toolbar lift and spin assembly and the main toolbar assembly are structured and operable to cooperatively transform the planter from the planting configuration to the transport configuration wherein a width of the planter in the transport configuration is less than or equal to a maximum load width defined by a Department Of Transportation for which special 'Wide Load' permits are not required.

* * * * *